H. A. HERR.
CONTINUOUS AUTOMATIC CENTRIFUGAL MACHINE.
APPLICATION FILED SEPT. 21, 1908.
1,166,370.
Patented Dec. 28, 1915.
10 SHEETS—SHEET 4.
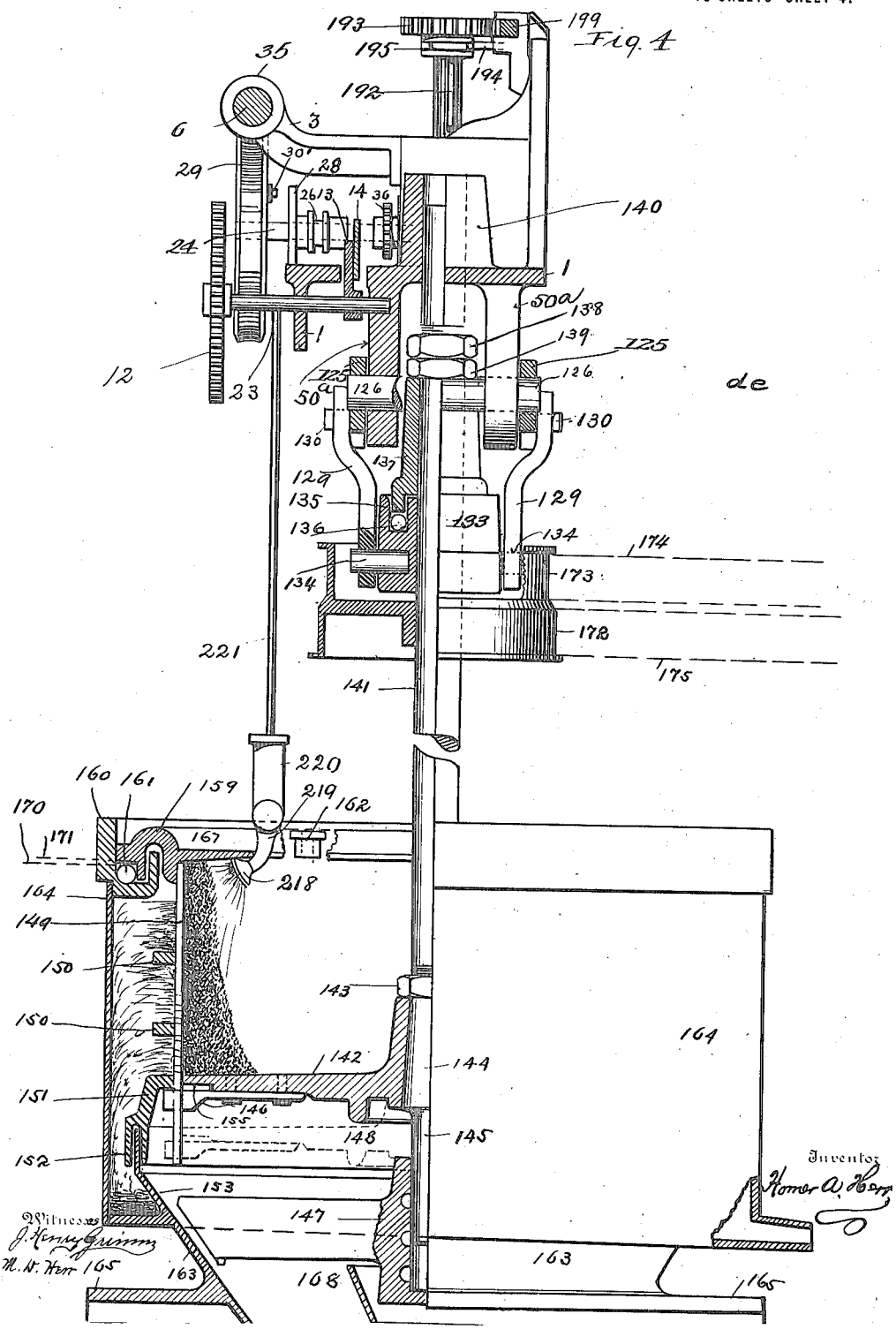

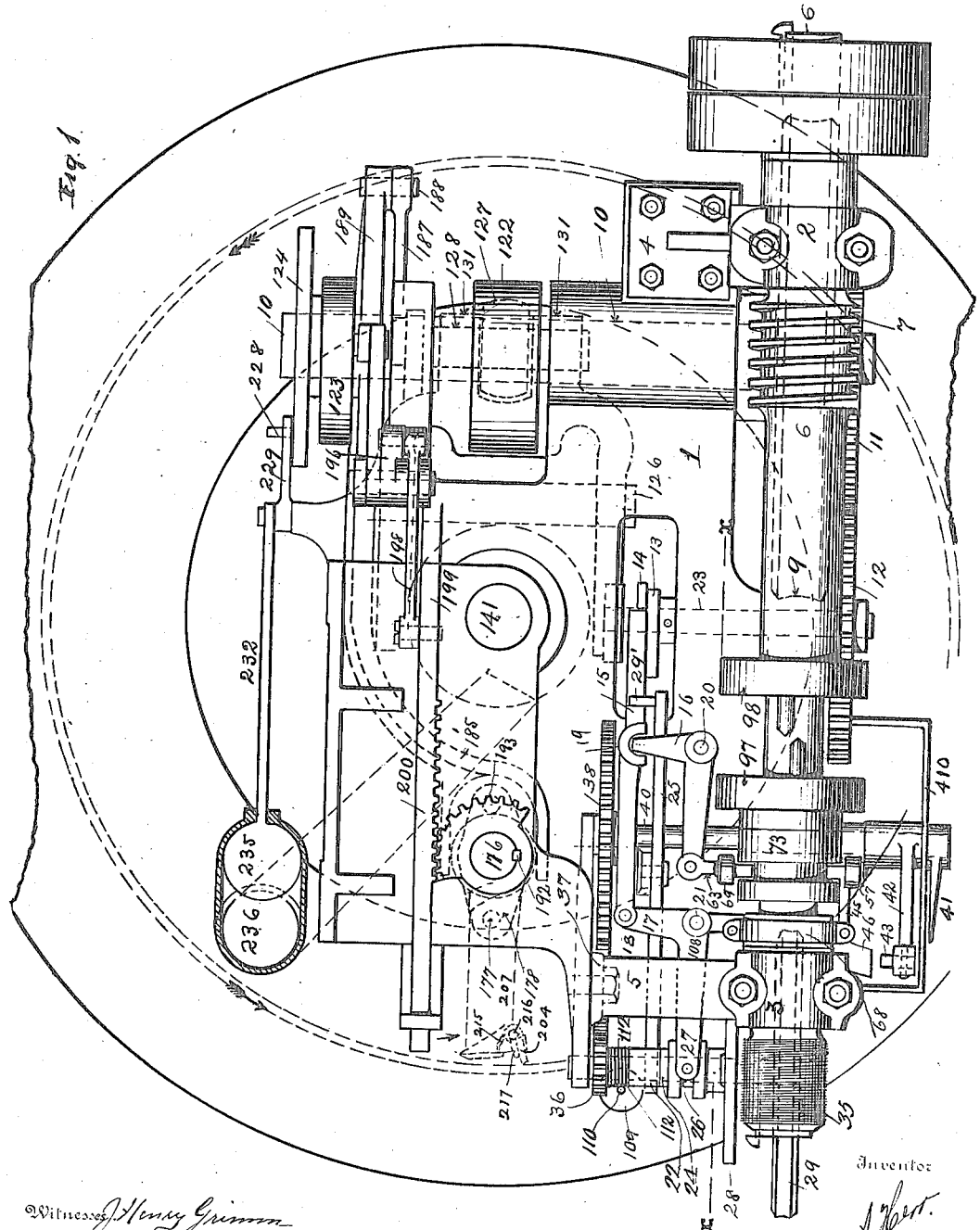

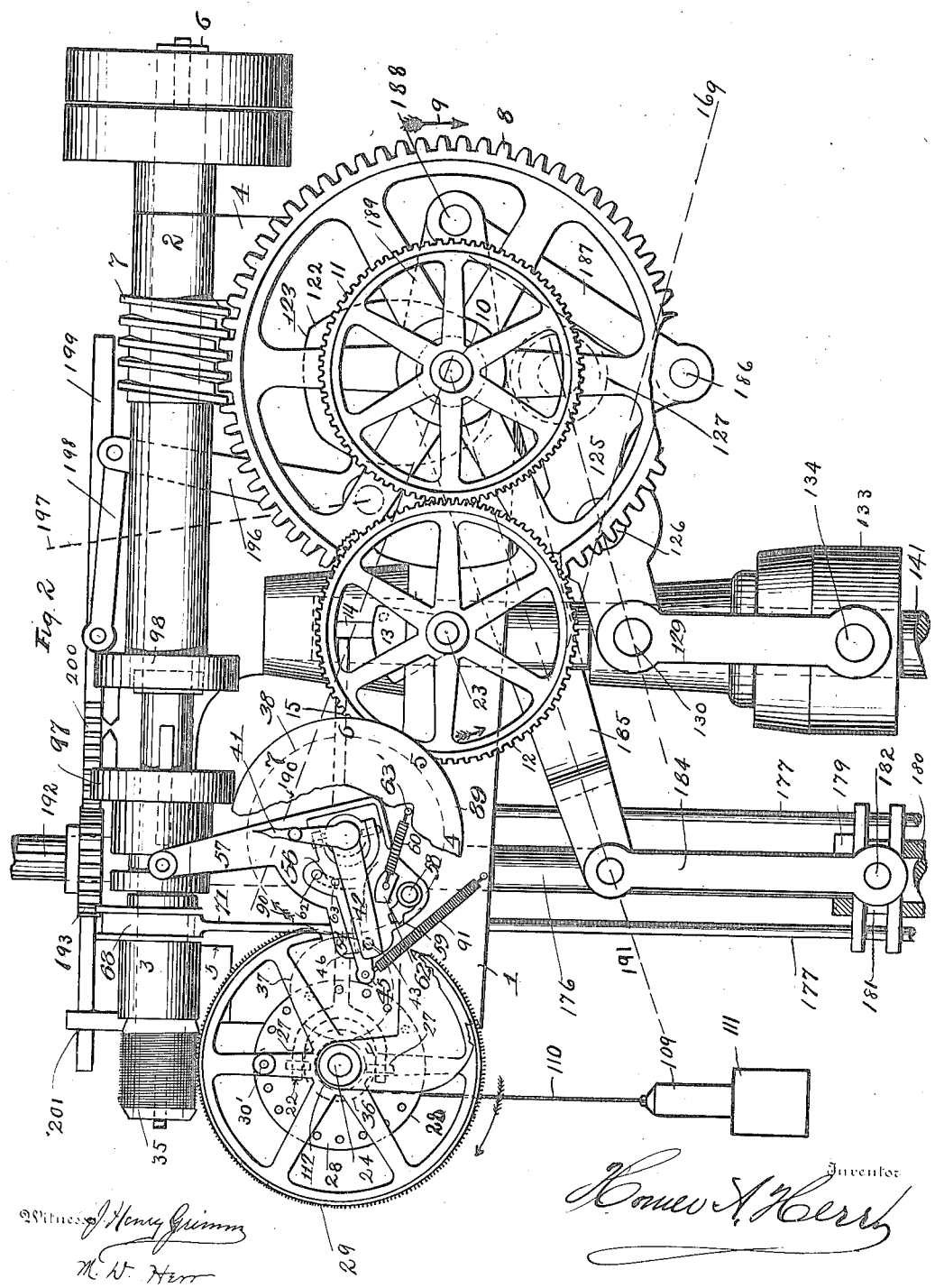

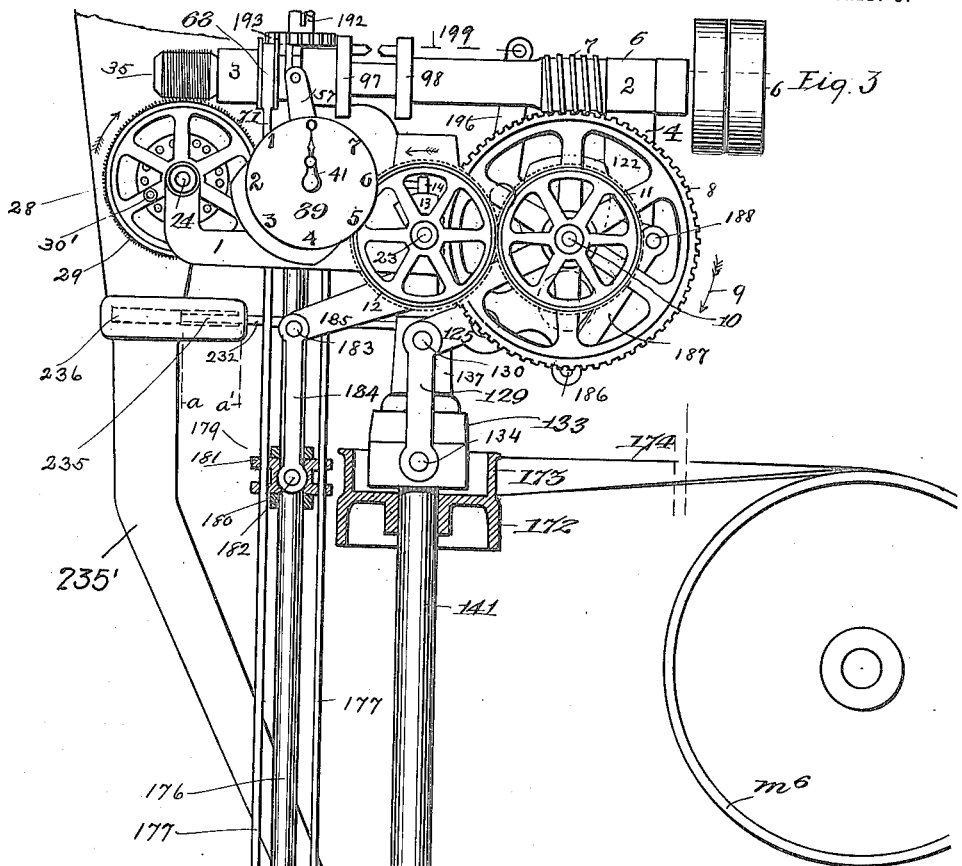
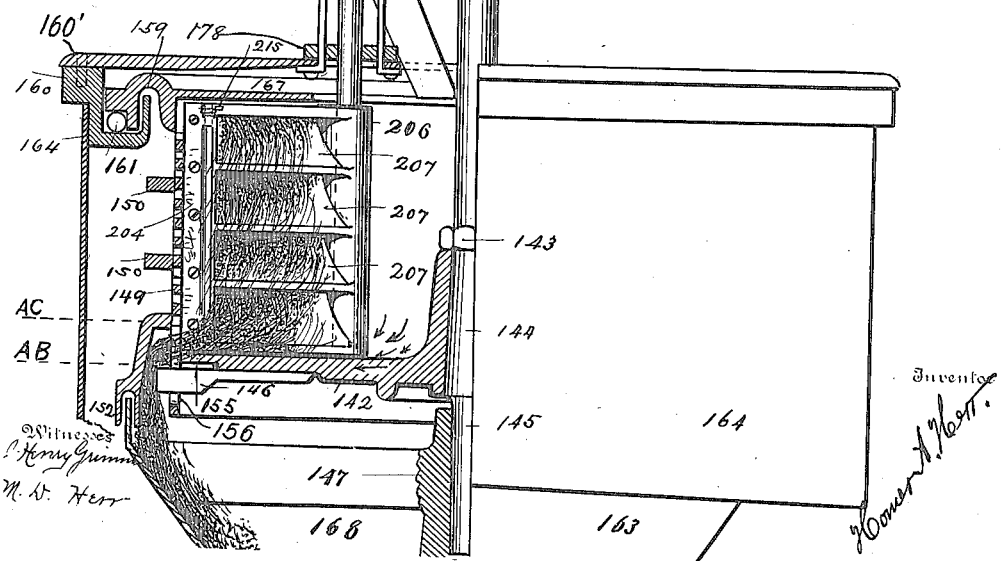

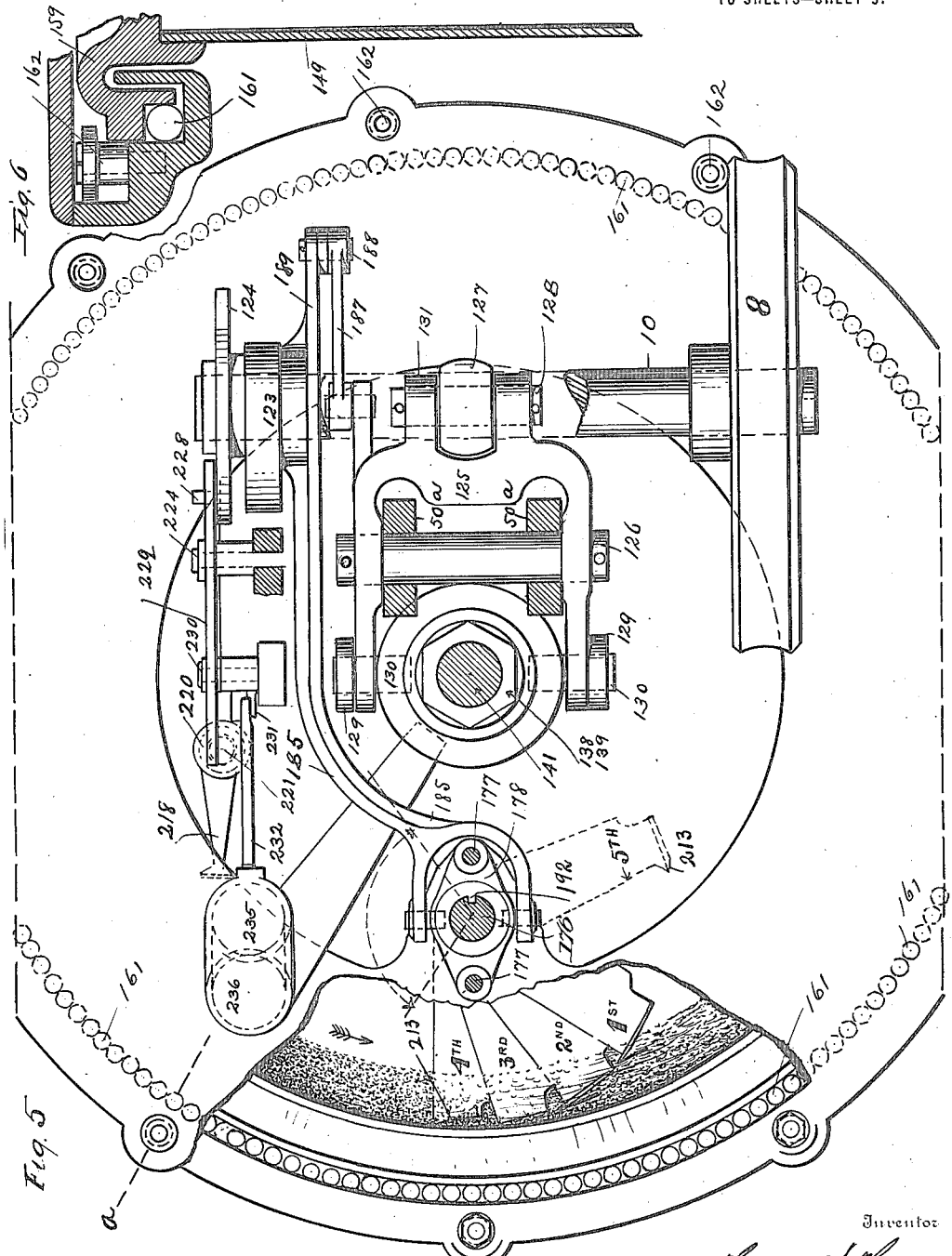

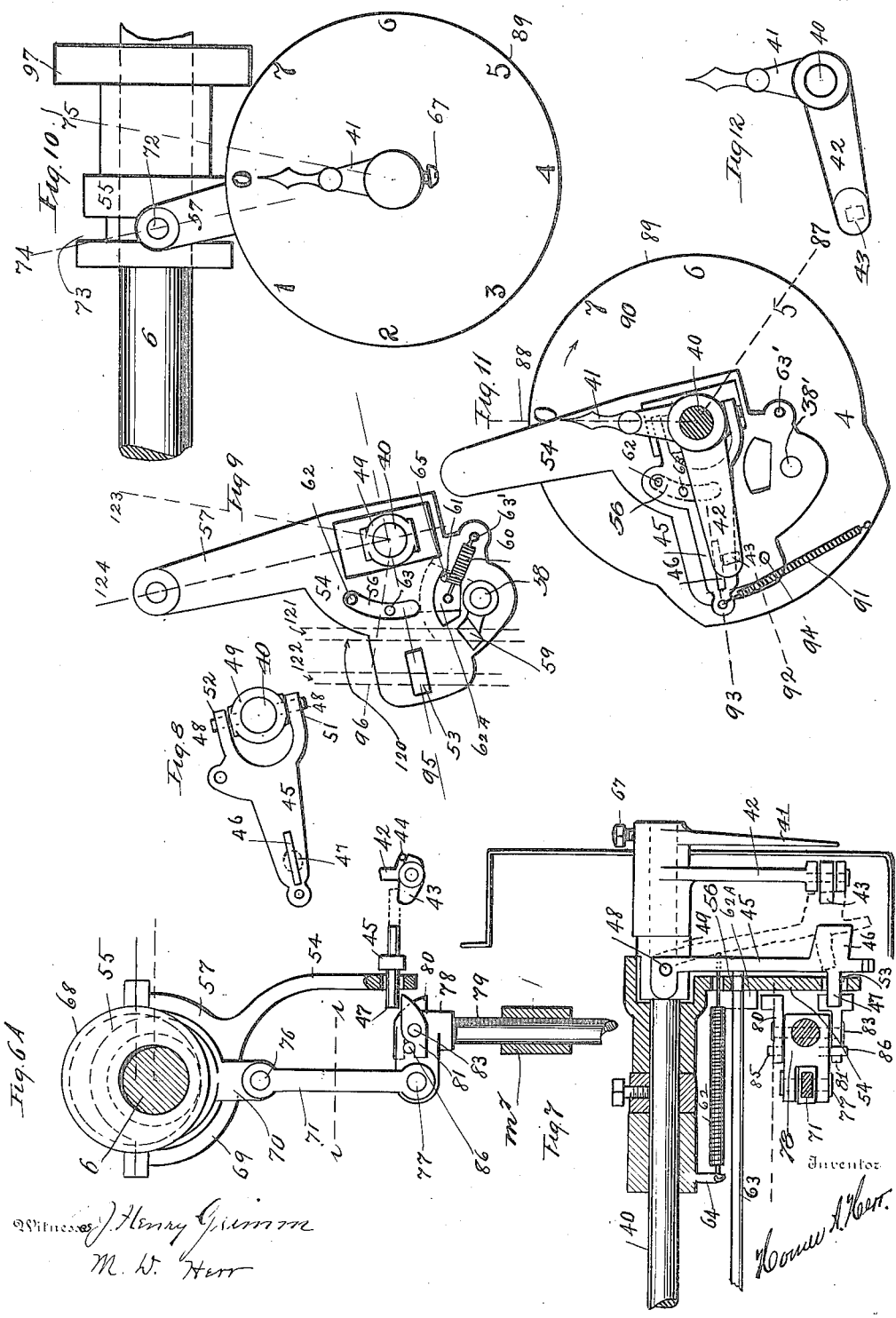

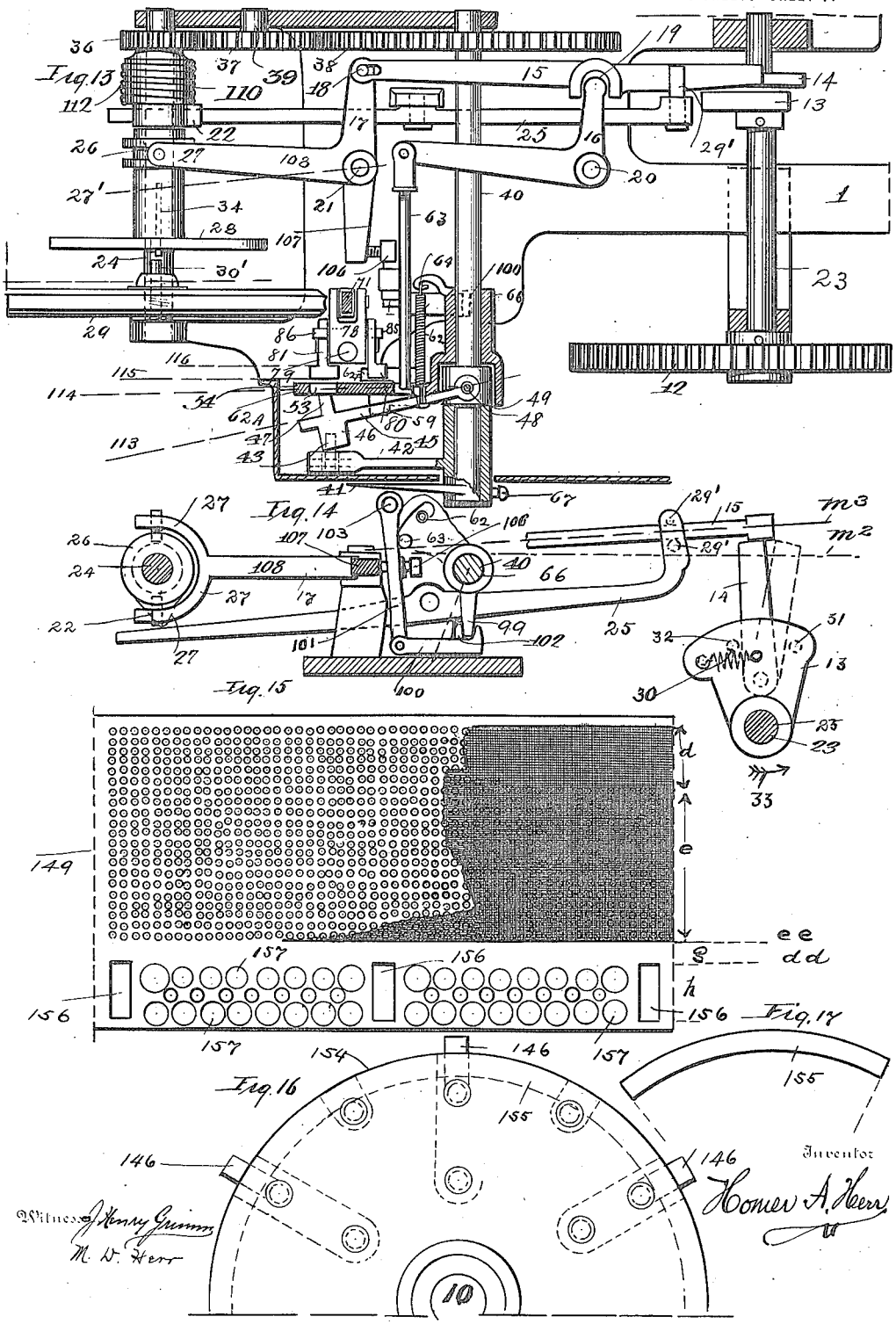

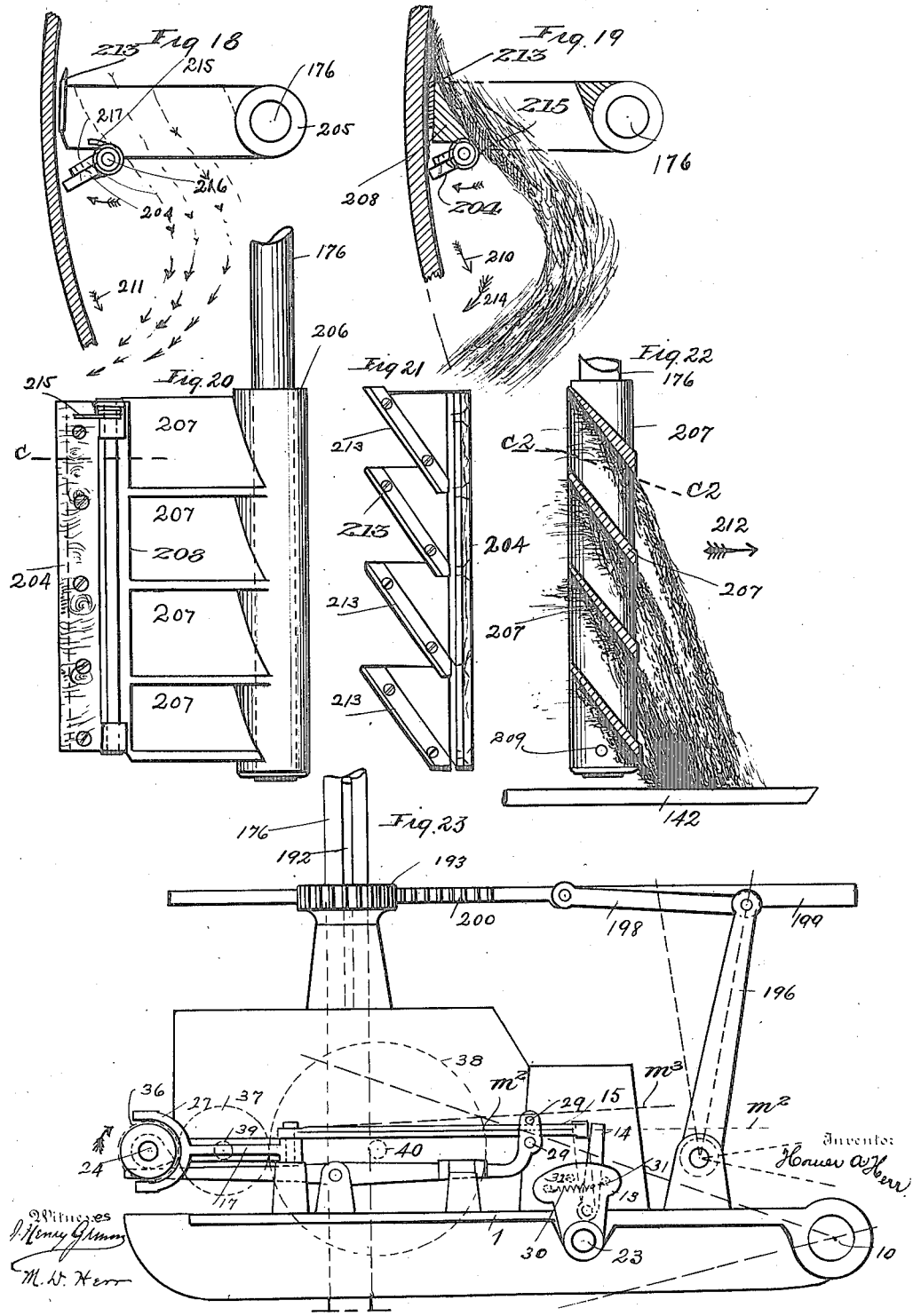

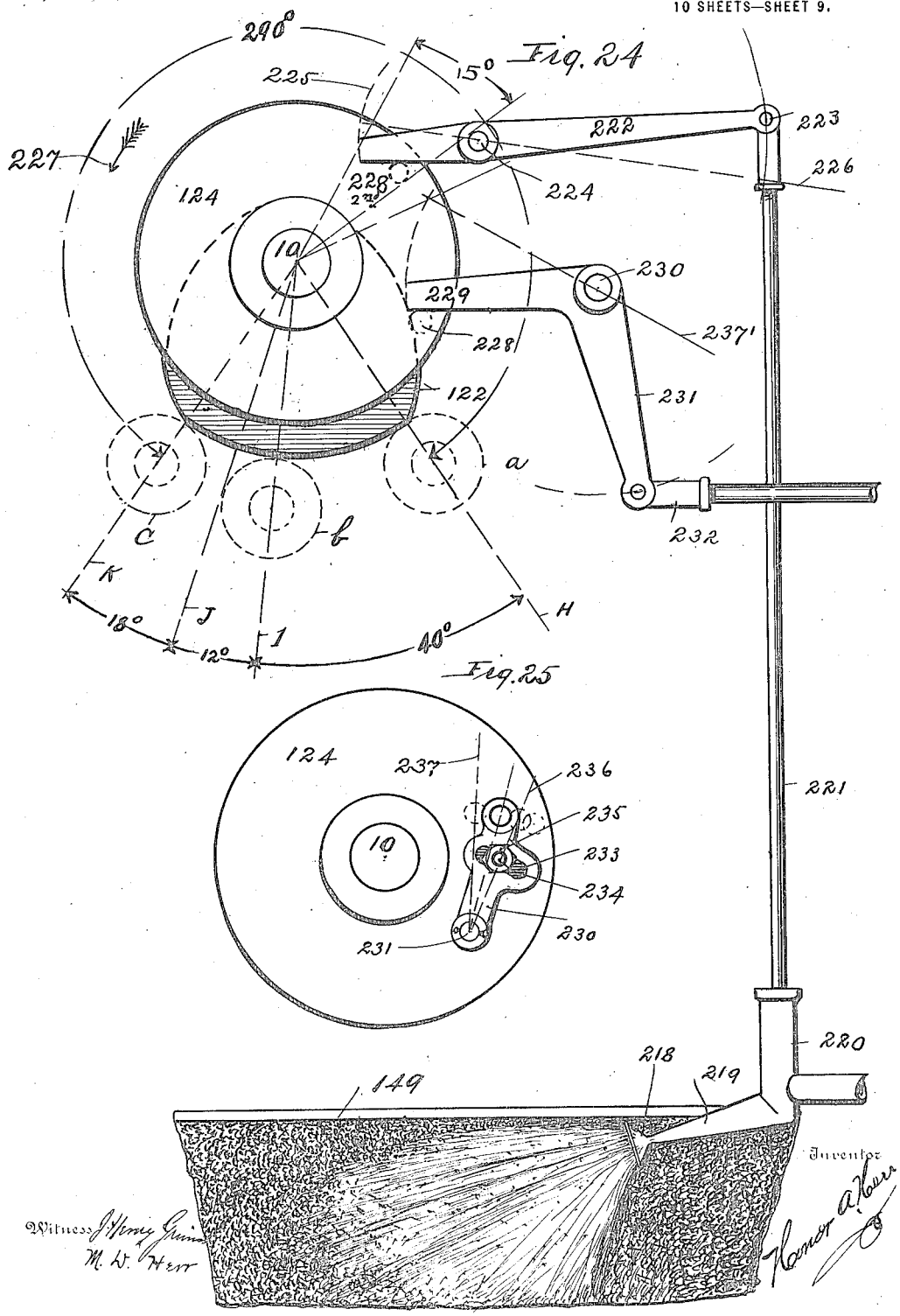

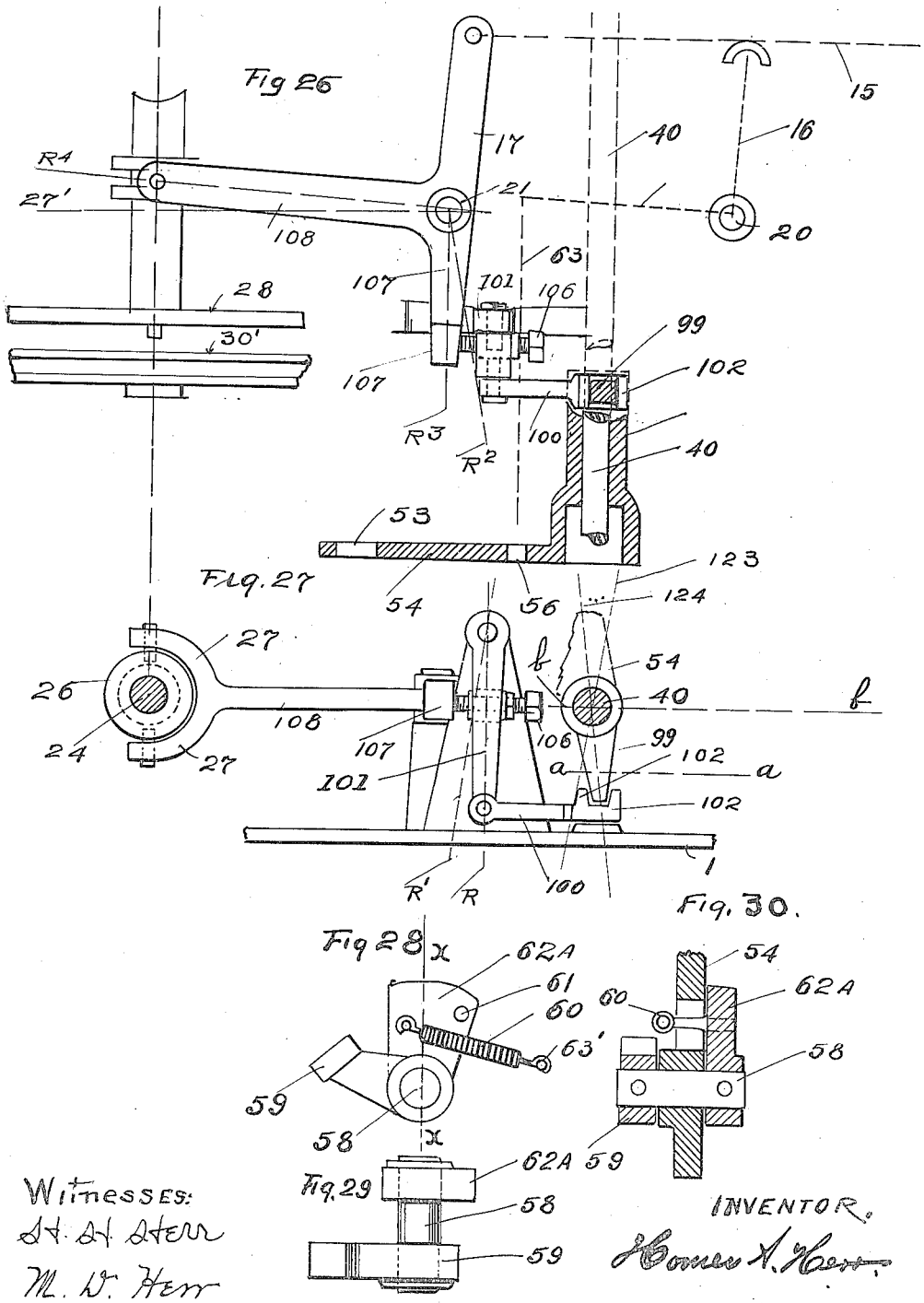

UNITED STATES PATENT OFFICE.

HOMER A. HERR, OF PHILADELPHIA, PENNSYLVANIA.

CONTINUOUS AUTOMATIC CENTRIFUGAL MACHINE.

1,166,370.  Specification of Letters Patent.  Patented Dec. 28, 1915.

Application filed September 21, 1908. Serial No. 454,063.

*To all whom it may concern:*

Be it known that I, HOMER A. HERR, a citizen of the United States, residing at Philadelphia, in the county of Philadelphia and State of Pennsylvania, have invented certain new and useful Improvements in Continuous Automatic Centrifugal Machines, of which the following is a specification.

My invention has reference to centrifugal machines or machines that separate liquids from solids by centrifugal action, and is fully set forth in the following specification and the accompanying drawings forming part thereof.

The object of my invention is to provide a centrifugal machine that is automatic and continuous in its action. That is, a machine that once it is started will feed itself with the substance it is desired to submit to purging treatment and after the liquid is separated from the solids will automatically discharge the retained solids from the basket of the machine without stopping. The stopping of a centrifugal between purgings, as it is done at present, is a great waste of power as all the friction so employed represents actual waste.

It is, therefore, the object of my machine to avoid this expense and reduce the cost of extracting liquids by centrifugal action. Not only do I reduce largely the cost of operating a centrifugal by the avoidance of the friction brakes now employed and the saving of the great power necessary to start the basket, and saving the labor inseparable from their operation, but I increase the capacity largely of each individual machine, so fewer machines are needed.

The economic features which I accomplish, therefore, are as follows: First: I dispense with the attendant which on intermittent starting and stopping machines must be employed. Second: I save all the power now wasted in the friction brake in stopping such machines after each load is purged, and third: I increase the capacity of each machine largely as there is no time wasted between purgings.

My machine consists of a basket having the lateral walls perforated at their lower end. The walls carry fine perforated brass or copper filtering sheets reinforced in accordance with the well known requirement for strength. This reinforcement consists of a heavy cylindrical sheet of steel with large perforations to permit the passage therethrough of the molasses or syrups and this cylinder of steel is again externally reinforced by the usual steel rings. Between the exterior wall of the basket and the interior wall of the outer casing is the syrup collecting chamber into which the syrup passes after passing through the perforations hereinbefore named. This outer casing at its upper end carries a ball race in which the balls are supported for carrying the basket. The over-reach of the basket projects over the ball channel or race and in this manner do I support the basket entirely independent of the main vertical shaft of the machine. The inner over-reach and outwardly extending over-reach are one integral element and should be turned true and well balanced, and it should be positioned absolutely concentric with the center of the shaft when the machine is erected and in operation.

A further feature of my invention is the manner in which the bottom of the basket is dropped out of position and thus the purged residuum is free to pass out by reason thereof, and the basket thus cleared for another load. To this end I make my shaft reciprocate vertically. The bottom of the basket is fixed to this shaft and holds the cylindrical walls of the basket in a fixed horizontal plane. (I, however, desire it understood I could revise this kinetic relation and instead of moving the bottom, I might keep the bottom in a fixed horizontal plane and give the walls of the basket a vertical reciprocation. The scope of my claims do not limit me in this regard and I desire it so understood.) The essential function accomplished is that I use centrifugal force to clear the basket of the solids, as well as the liquids.

The means I employ for dropping the vertical shaft and the bottom of the basket which it carries out of its normal position, I will describe hereinafter in this specification. The bottom of the basket carries radial projecting lugs, and the basket walls are slotted vertically at various points to receive and retain these lugs. The vertical limit of these slots is made to conform with the vertical reciprocation of the bottom of the basket and its supporting vertical shaft. Below the normal line of the bottom I have enlarged holes or slots in the cylindrical walls of the basket through which the residuum remaining in the basket after the purging, is discharged into a receptacle below the machine.

A third feature of my invention is to provide a time controller for pre-determining the time that material shall remain in the basket subject to centrifugal action. This time varies with the nature of the material but can be made to suit any requirement. The specific description I will give later in this specification.

A fourth feature of my invention is to provide an automatic gate for the admission of syrup to the basket to be operated immediately following the return of the basket bottom to its normal position and the controlling of the time for opening and closing this gate.

A fifth feature of my invention is the means I employ to clean the basket after the material is purged. This consists broadly of a plow or scraper, stationary, as to any except vertical movement and a slight slow oscillation, which, as the bottom descends with the prime vertical shaft which supports it, it also descends and, after it has reached its lower position, it is slowly swung in the path of the residuum and gradually removes the said residuum mass which hangs to the sides of the inner wall of the centrifugal basket and drives it to the bottom of the basket where the centrifugal force and action being unrestricted by a resisting wall by virtue of the holes aforesaid, will force it from the zone of the basket into the passage leading to the receptacle below and outside of the machine. The construction of this plow is such that a steel knife will remove all of the residuum in very small vertical sections as the rotating mass comes in contact therewith while the plow is oscillated slowly to the zone of the residuum. This knife, however, cannot come in contact with the wall of the basket as its radius is shorter than the radius of the inner wall of the basket, but I propose a wood scraper, having an extended radius and carried by the plow which slightly scrapes the wall and thoroughly cleans it. This plow, aside from the knives and wood scrapers, carries a series of angular, downwardly inclined wings, one for each knife, and as each knife removes its section of residuum from the lateral wall of the basket its co-acting wing takes it and forces it down violently to the bottom of the basket where centrifugal action will expel it from the basket zone as set out. I also provide means for returning this plow to its normal position after each action.

A sixth feature of my invention is to provide a means to inject a spray of water into the basket as the sugar syrup (when the centrifugal is used for sugar) is nearing its completion of a purge. It is well known in the manufacture of sugar that the injection of a water spray will brighten the color and beautify the appearance of the sugar.

A seventh feature of my invention is the centrifugal seal which I employ to prevent leakage, carried by the bottom of the chamber, at its perimeter and when extended by centrifugal action sealing the space between the said bottom and the inner wall of the basket.

An eighth feature of my invention consists of means for changing the air current induced by centrifugal action.

A further feature of my invention is to reduce the speed of the basket while the residuum is being removed therefrom and to have the basket entirely supported by the vertical shaft when purging and at high speed but by the balls supported in the ball race of the exterior casing and at slow speed while cleaning.

Other features of my invention will be referred to hereinafter.

In the drawings like parts are referred to by marks or figures of a corresponding kind in the different views.

Figure 1 is a general plan of the machine looking down on the top. Fig. 2 is a front view of the machine showing prime shaft and the parts it actuates. Part of the indicator disk is removed to show the clutch moving mechanism in its relation to the other elements. Fig. 3 is also a front view reduced in size and showing the full indicator disk, also showing the basket, one half in vertical section and one half in side elevation. Fig. 4 is a one half vertical section through the basket and its actuating shaft supporting parts and a one half end elevation of these same parts. Fig. 5 is a plan of the mechanism for raising and lowering the basket cleaner and the main vertical basket supporting shaft of the machine and the manner of supporting the latter shaft. The molasses gate and water jet mechanism is also shown in this view. The main supporting frame is removed but the supporting lugs 50ª 50ª for the basket supporting pin 126 which lugs are integral with the main supporting frame aforesaid on the underside thereof, are shown in horizontal section through the plane of the center of the pin 126. Fig. 6 is a section on line a, Fig. 5, showing friction roller and ball bearings and channel therefor. Fig. 6ᴬ is a transverse sectional view of the prime shaft and an end view of the eccentric which primarily controls the movement of the clutch moving arm, also, an end view of this arm. This view also shows the carrier for the double dogs, one of which forces the clutch in and the other out, as will be explained. Fig. 7 is a vertical section through the indicator finger carrying shaft and some of its connections. Fig. 8 is the oscillating lever which is moved by the finger arm and carries integrally the lug or nose for engagement by the dog which throws the prime clutch into operative position. The supporting collar for this lever is also shown in this view. Fig. 9 is the clutch shifting arm with the pivoted interponent 62ᴀ which it carried for disengaging the clutch after the vertical shaft has been raised and the bottom of the basket with it. Fig. 10 is a side view of the indicator disk, finger and clutch jaw. Fig. 11 shows the indicating finger and its integral arms, the clutch shifting arm and the oscillating lever shown in Fig. 8, all in their correct relative position, just at the time the finger commences to oscillate the said oscillating lever. Fig. 12 is the finger for indicating time for purging. Fig. 13 is a plan of the mechanism for operating the indicator finger and for moving the clutches. Fig. 14 is part end view and part section of Fig. 13. This view also clearly shows the cam for tripping the bell crank lever actuating bar 15 out of normal to be ready for the next operation. Fig. 15 is a section (inside view) of the basket. Fig. 16 is the bottom of the basket. Fig. 17 is one of the centrifugal segments, carried by the said bottom. Fig. 18 shows the cleaner in position after knife has had its full movement and scraper just starting in action. It is a section on line C, Fig. 20. Fig. 19 is a section on line C² C², Fig. 22, and shows the action of the sugar as it is thrown from the basket wall and as it is passed from the basket bottom by centrifugal force. Fig. 20 is an elevation of the scraper and its support. Fig. 21 an end view of the cutters. Fig. 22 shows the position of cleaner in relation to bottom. Fig. 23 shows one arm of the cam controlled bell crank lever for swinging the basket cleaner and another position of the bell crank tripping arm indicated by dotted lines. Fig. 24 is the device for changing the time of valve action for feeding the basket with material for purging and also for water jet action. Fig. 25 shows an adjustable lever whereby the throw of the trip for levers 222 and 229 can be varied. Preferred construction. Fig. 26 is a part section on line $a\ a$ of Fig. 27, part section on line $b\ b$ of Fig. 27, and plan of the mechanism for unlocking the clutch jaws 28—30', or timer clutch, enlarged with some additional details over Fig. 13. Fig. 27 is an end view of the same mechanism shown in Fig. 26. Fig. 28 is a side elevation of the inside and outside interponents removed from their supporting arm 54. Fig. 29 a plan of same. Fig. 30 a section on line $x\ x$ of Fig. 28.

*Detail description of machine.*

1 is the main support for the mechanism of the machine, aside from the basket and its immediate supports. This support can be bolted in practice to the tank which supplies the molasses or juices it is intended to treat in the machine, or it can be supported on a frame designed for this purpose. It is a matter of prime importance, however, that this frame be held fixed and unyielding in its relation to the basket and its support. The basket should rotate from 1000 to 1700 revolutions per minute, depending on the diameter.

The main support, or bed plate 1 carries bearing supports 4 and 5 and these bearing supports carry bearings 2 and 3, Sheets 1 and 2. In Fig. 1 these bearings are shown as cap bearings, in Fig. 2 as solid ones, but their specific character is immaterial. The bearings 2 and 3 carry a shaft 6 and the said shaft a fast and loose pulley for operating it shown in Figs. 1, 2 and 3 but not numerically designated. 6 is the prime shaft of the machine. 7 is a worm carried on prime shaft 6, and 8 is a worm wheel which it actuates (in the direction of arrow 9). 10 is a shaft on which said worm wheel 8 is rigidly supported and which it rotates.

One of the functions of the shaft 10 is to vertically reciprocate the shaft 141 which carries the basket bottom 142, and this is accomplished by the following mechanism.
*Lowering and raising the basket bottom.*—122 is a cam carried on shaft 10, 127 is a friction roller shown in Figs. 1 and 2. This friction roller is carried by a lever 125. Figs. 1, 2, 3 and 5, said lever being U shaped, as shown in Fig. 5 and straddling the shaft 141 by the two arms, forming the U. This lever 125 is pivoted into the main bed plate of the machine and held therein by pivot pin 126. Lugs 50ᵃ and 50ᵃ, shown in horizontal section in Fig. 5 and in vertical section and elevation in Fig. 4 support this lever to these integral depending lugs as shown. 128 is a pivot pin holding the friction roller 127 to the lever 125 through arms thereof 131, shown in Fig. 5. 129, 129 are two links, best shown in Figs. 3, 4 and 5, pivoted to either arm of the U shaped lever 125 and supported thereto by pin 130. 133 best shown in Figs. 2, 3, and 4 is a ball bearing carried and supported to lever 125 by links 129, 129 aforesaid. 137 is the direct shaft support; this shaft support rests on the balls 136, in the ball race of 133, through the annular, depending shaft concentric-flange 135. 138 and 139 are two lock nuts permitting of adjustment between the shaft support 137 and the ball carrier 133. 142 is the basket bottom, having a locking nut therefor 143. The shaft 141 is tapered at 144, thus holding the bottom 142 very rigid. 146, 146, 146, 146, are a series of radial arms carried by the basket bottom. These radial arms pass into the holes of the basket perimeter, 156, see Fig. 15. This is the only view in which these slotted holes for the reception of these radial arms is shown, but the position of the arms 146, 146 when assembled is shown in Fig. 4 and Fig. 3. From the foregoing description it is evident that when the shaft 141 drops down the arms 146 on the bottom of the basket 142 will be free to slide in the slots 156 of the perimeter of the basket. Now while the machine is at high speed the shaft support 137 is in contact with and rests on balls 136, through the annular flange 135 aforenamed and the ring 159, which supports the basket wall 149, with its annular rings 150, 150, and its shields 151 and 152, is raised off of friction balls 161. These latter balls, be it understood, are carried in the stationary annular support therefor, 160, Figs. 3 and 4, the latter being held rigidly to the support 163 and 165 for the outer basket casing. All that is necessary in practice is to have the basket supporting annular ring 159 off the balls 161, when the basket is at high speed or raised from line 170 to line 171, Fig. 4. This relieves the basket from friction as the entire weight is on balls 136, which are few in number and whose ball race is relatively small in diameter. But the moment the cam 122 has moved to permit the shaft 141 to be lowered the basket perimetral ring 159 rests on the balls 161 and this stops the downward movement of the basket perimeter. Now while this perimeter is being raised from line 170 to 171, or say ¼", the radial arms 146, 146, 146, 146, engage on the upper edge of the slots 156 in the perimeter 149 of the basket, or on the line indicated at d d, Fig. 15, but as the shaft 141 moves downward, through the action of the cam 122 and the intervening elements described, and this movement brings the basket ring support 159 in contact with rollers 161, then the said basket perimeter is arrested in its downward motion, and the lugs 146 become disengaged from the top of slot 156 and move down the slot to the limit of the movement of the shaft 141 and the bottom 142. The upper limit of movement of the basket bottom and the action of the material in the basket are shown in Fig. 4, where, it will be seen that the basket bottom is up and the solids are held in the basket, while the bottom position of the basket bottom is indicated by dotted lines.

The lever limit of movement of the basket bottom and the action of the material while in this position is shown in Fig. 3, where, it will be seen, the material purged from its liquids is passing out through holes 157, 157, see Fig. 15, by centrifugal action. Lines A. B. Fig. 3, indicate lower limit or discharging position of basket bottom. Lines A. C. indicate upper limit, or purging position of basket bottom. I do not attempt to illustrate these holes 157, 157 for the discharge of the solids in any but Fig. 15 and would request that this figure be taken in connection with Figs. 3 and 4 and the space between lines d d and e e, Fig. 15, is the horizontal position the bottom of the basket occupies while the material is being purged, and when the solids are being discharged the downward movement of the bottom, as described exposes the holes 157, 157, permitting them to pass therethrough and from the basket. In Fig. 15, section e represents O O perforated metal and section d No. 8 wire mesh usual in centrifugal basket construction. 172 is a belt wheel of different diameters 173 representing the smaller, 174 is a belt and M⁶ is belt pulley. Now when the shaft 141 is raised the speed of the basket must be high as this is the purging position, therefore, as it is so raised the belt 174 is placed on the high part of the pulley 172 and the full rotation is given the shaft 141 that the pulley M⁶ is capable of transmitting; when the shaft is lowered so that the belt is on pulley 173, it is so loose that it slips and the basket moves slowly. This is during cleaning the basket of solids after purging.

It is scarcely necessary to say that when the low part of cam 122 is resting on the friction roller 127, the lever 125 is in the position indicated by the dotted line passing through center of pin 130 Fig. 2 and bottom of basket is down, and when the high part of the cam 122 rests on friction roller 127 the basket bottom is up and basket supporting ring 159 is off rollers 161, and lever 125 occupies position of radial line 169. I desire it understood that I do not limit myself to the belt actuating power; I could use many modified structures for varying the speed of the motor from maximum during purging to minimum during cleaning, all within the range of my invention. I could use a motor with two speeds, one with full control for one speed and armature control for another speed, and regulating device to change the control from field to armature and vice versa at a predetermined time in the cycle of the machine.

*Cleaning the basket of solids.*—This consists broadly of a frame carrying a series of cutters and deflectors. The entire structure passes down into the basket only after purging, and when down to its limit it is oscillated toward the basket wall in a direction opposite to the rotation of the basket wall or perimeter. The deflectors gradually engage with the solids on the wall and remove them and finally a wood broom or sweep, so to speak, sweeps the inner wall of the basket, after which the sweeping mechanism is automatically removed from the basket. 176 is a vertical shaft, 177, 177 are two vertical guide rods for said shaft, parallel therewith, equally distant therefrom and fixed at their two extremities. At their upper extremity they are threaded into or otherwise fixed to bed plate 1 and at their lower extremity riveted or otherwise held by plate 178 or basket cover 160', shown only in Sheet 3 of Fig. 3. 179 and 180 are two collars fixed to shaft 176, 181 is a collar guided on rods 177, 177. 182 is a pin holding link 184 to member 181. It will be understood that the shaft 176 is free to oscillate in collar 181, and it is also free to move vertically in said collar. This shaft 176 extends in practice above the gear 193 a sufficient distance to accommodate the downward movement thereof. That is if the downward movement of the shaft 176 is 14 inches the shaft when it is up must extend 14 inches above the gear 193, so that by no possibility can the said shaft become disengaged from the said gear. The spline 192 in the shaft must be as long as its vertical movement and the gear 193 must carry the key so as to permit the shaft to move free in its vertical travel. The collars, therefore, 179 and 180 being fixed to the shaft 176 become the thrust receiving members for the vertical movement of the said shaft, and the fact that the collar 181 is guided by the fixed rods 177 prevents it from turning and the link pins 182 are thus held in fixed alinement. 185 is a lever, as shown in Fig. 5; it straddles the rod 176, also, the two guide rods 177, 177, and carries two links 184, 184. These links connecting the lever 185 with the rod lifting collar 181 and whereby the vertical movement of the rod 176 is controlled. 186 is a pivot pin connecting link 187 to lever 185. The lever 185—189 is pivoted to the shaft 10 which carries the cam 122 aforesaid, therefore, as the vertical basket bottom supporting shaft 144 moves down the lever 185 and shaft 176 move down and vice versa, as the former moves up, the latter moves up. This arrangement makes it practically impossible for the basket bottom and the basket cleaner to move out of unison, a very important matter. The dotted line 190 in Fig. 2 shows the upper position of the lever 185 and the dotted line 191 the lower position.

After the rod 176 and its supported parts are down to the limit of their movement the basket wall is cleaned as follows; The shaft 176 at its upper extremity carries a long keyway 192, a key and a gear 193, Figs. 1, 2 and 4. This gear is fixed against vertical movement by a holding pin 194 engaging in a circumferential groove 195, Fig. 4 only. Now as the arm 185 of the lever 185—189, is controlled by the lever 125 through link 187, it follows that as the cam 122 raises the lever 125 from the position shown in the solid drawings, Fig. 2, to the dotted line 169, the shaft 176 will slide up the key moving in the said keyway 192 and when these parts move down it will slide down.

In Figs. 1 and 5 I show a cam 123. This cam is not shown on any other views. It is a box cam and carries the roller which operates the bell crank lever 196. I do not show the roller race of this cam as it is not deemed essential. Sufficient to note that the following is its function; as the rod 176 descends the gear 193 is stationary but immediately the said rod reaches its limit of downward movement the bell crank lever 196 is moved through the link 198, which connects it with rack 199; the said bar carries rack 200, which meshes with gear 193 (201 is a guide for the rack bar). The cam 123 is so timed that when the basket is rotating it holds the chamber cleaners, shown in Figs. 18 to 22 inclusive, in the position shown in Fig. 5, Sheet 5, and indicated by " 5th " and it holds the cleaner in this position until the bottom of the basket is lowered to the limit, as shown in Fig. 3, when the said cleaner carried rigidly on the rod 176, is slowly oscillated, first into position marked 1st., Fig. 5, in which position it has its initial contact with the sugar hanging on the wall of the rapidly rotating basket. After position 4^A is reached the knives 213 on the edge of the cleaner frame will have passed the extreme radius limit of the basket and will have removed all the sugar, save a very thin portion which will still hang in the basket wall. The scraper 204 will then finish the cleaning of the wall by contact therewith. This scraper is made of wood and swings in such a manner on its individual pivot that the wood cleaner 204 when extended radially with the cutters, will increase the net radius and thus insure proper cleaning of the basket wall. Its operation is as follows;

*Construction of cleaner.*—206 is a central stem having integral wings 207, 207, 207, 207 and an outer integral wing connection 208. These parts are all in one solid casting. The shaft 176 passes through the central stem 206 and holds the cleaner firm and rigid therewith. The wings 207, 207, etc., are inclined to an angle of 45° on their support. Now the arrow in Fig. 5 shows the direction in which the basket travels. This corresponds to the arrows 210 of Fig. 19, 211 of Fig. 18 and the arrow 214 Fig. 19 shows the direction of the sugar when brought under centrifugal action in its passing from the basket after being deflected as shown in Fig. 22. The arrow 212, Fig. 22, indicates the lines of force in which the sugar contacts with the deflectors from which line it is deflected 45 degrees to the bottom 142 of the basket, and is there forced through holes 157, 157, hereinbefore referred to, and as illustrated in Fig. 15. 217 Fig. 18 shows the support for the wood scraper 204, a spring 215 holds these parts in yielding position. 216 is a pivotal support for the yielding scraper holding it to the outer part 208 of the deflector frame. Now after the walls of the basket are cleaned as described the rod 176 is oscillated back to the position marked "5th" after which the cam 122 raises both it and the bottom of the basket by the mechanism described and the machine is ready for another load of syrup.

*Feeding the centrifugal with syrup.*—The manner in which I feed the machine with syrup is as follows; As already described 122 is the cam which raises and lowers the bottom of the basket, as soon, therefore, as the basket bottom is raised and the cleaner out of the basket, the cam 122 is on its high point. This point amounts to about 70 degrees of the cam's circumference. When the friction roller 127 which directly controls the movement of the cleaner carrying rod 176 and basket bottom shaft 141, through the levers and links already described, has raised these two rods to their top limit, or initial positions, the pin 228, Fig. 24, on the disk 124, Figs. 1, 5, and 24, occupies the position shown in Fig. 24, as contacting with the bell crank 229. Now while the cam 122 slowly rotates 40° or from radial line I to radial line H, the said lever 229—231 will pull the rod 232 toward shaft 10 and the valve 235 will move from valve position 236 to position marked 235 and the syrup will flow, charging the centrifugal basket through the feed trough shown in Fig. 3. The movement of this valve is indicated in Fig. 3 as being from dotted line $a$ to dotted line $a'$. The shaft 10, which carries the pin holding disk 124 rotates slowly and when the radial line 237′ is reached in the oscillation of the bell crank 229—231, the feed gate 235 has admitted sufficient syrup in the basket for a purge and by a weight or spring (not shown) is immediately closed as the pin 228 passes from lever 229. The friction roller has rolled from H to I in this valve action and syrup feeding just described and the cam 122 has moved from I to H. Now while the cam travels from I to J the slack is taken up in the bar 14 Figs. 1, 13 and 14 and the bell crank 17—108 will have been oscillated, putting the pin 30′ in one of the holes of the clutch disk 28, Fig. 2. The shaft 10 is the secondary shaft and it will be noted, controls the vertical movements of the basket shaft, the syrup feed valve 235 and the water spray rod 221 and, inasmuch, as all these functions are related in the time of their performance with the timing mechanism it also controls this latter mechanism in the following manner: The spur 11 on shaft 10 operates spur 12 on shaft 23 and the cam travels from I to J, as described, and about the time it reaches J, the dog holder 13 on shaft 23 will have taken the position indicated by the dog 14 in dotted line, Fig. 14, and as the bar 15 at this time is down, or at line M², the said dog will engage the said bar and move it forward. 16 is a bell crank lever engaged by a lateral slot in bar 15 at 19. 63 is a link pivot-rod pivoted to the longer arm of said bell crank lever, 45 is a pivoted clutch tripping lever, carried pivotally by pin 48 to collar 49 on rod 40. 17 is the short arm of a bell crank and 108 is the long arm thereof. It is pivoted at 18 to sliding link or bar 15.

Now as the dog 14, after contacting with the end of bar or link 15, as described is further moved the bell crank 16 will be oscillated, and the rod 63 thereon will push the pivoted clutch trip 45 from engagement with the hole 53 of the clutch moving arm. It is evident that this will have been accomplished by the dog 14 on the dog holder 13, on the shaft 23 moving the said link or bar 15 in the normal direction of its motion, as shown by the arrow 33, (said arrow indicating the direction of rotation for shaft 23) Fig. 14. As the clutch trip 45 passes from the hole 53 as just described, see Figs. 12, 2, 7, 8 and 11, the spring 91, which is fixed to the said lever 45 at one end and to the frame of the machine at the other end will pull the said clutch lever 45 down against the oscillating arm 59 of its pivoted rod support 58, Figs. 2 and 9 best shown. 62ᴬ is an internal arm of lug on pivoted rod 58. Like 59 it is rigidly held on said rod 58, the said rod being a pivotal support for both 59 and 62ᴬ. 59 being on the outer side of the clutch moving member 54 and in the path of the downward swinging clutch lever 45, and 62ᴬ on the inner side of the same and in the path of a dog 80. Now as the lever 45 is pulled down by said spring it will engage the top of the arm 59 and oscillate it until it reaches the position predetermined by stop pin 94, Fig. 11, and as 62ᴬ is on the same pivoted pin 58, the latter will also be oscillated and this oscillation will carry it from the inner to the outer dotted line 121, Fig. 9, and in this latter position it will be engaged by the vertically reciprocating dog 80 pivoted to 78. During this movement the arm 57, which is the clutch moving arm, and integral with 54 will be oscillated from dotted line 75 to dotted line 74 in Fig. 10, which is the same as line 123 to line 124, Fig. 9 and the clutch jaw 97 will be thus disengaged from clutch jaw 98 and the worm 7, which is carried on the sleeve integral with the clutch jaw 98, will be arrested and, therefore, the worm wheel 8 and shaft 10 will also be arrested. The friction roller 127 will stop with the cam 122 at line J, in Fig. 24. It is scarcely necessary to remark that the cam 122 in Fig. 24 is in the position it so occupied in this figure when the basket bottom is up and in the position shown in Figs. 2 and 3 when the bottom is down. It will be seen from the foregoing that as the bar 15 moves forward by the dog 14, as set out; and as the bell crank 16 is oscillated on its pivot 20, the bell crank 108—17 is also oscillated on its pivot 21, and as the arm 108 of the said latter bell crank is oscillated to the radial line 27' the clutch disk 28 is moved toward the pin 30' and one of the several holes in said disk engages said pin, locking the wheel 29 to disk 28. Thus when clutch jaws 97 and 98 are being disengaged, as just described, jaws 30' and 28 are being engaged. Now while clutches 97 and 98, and 30' and 28 are disengaging and engaging respectively, as described, the shaft 10 rotates 12 degrees, as well as its rigid parts, or from I to J in diagram Fig. 24. Shaft 10 is now at rest because clutch jaws 97 and 98 are disengaged and while this shaft is at rest the shaft 141 is, of course up, and belt 174 is on high part of belt wheel 172, Fig. 3. The purging is, therefore, done while shaft 10 is resting and while the timing finger 41 is traveling rotatively to its predetermined limit, at the expiration of which time the clutch jaws 97 and 98 are again engaged and the clutches consisting of disks 28 and 30' are disengaged, and the basket bottom and basket cleaner are again ready to go down, for which function the cam 122 starts rotating at the radial line J. While this cam travels from J to K or 18° the basket is stationary and while it thus travels the already purged sugars receive a spray of clear water which clarifies and beautifies the sugar.

*The timing mechanism.*—The spraying of the sugar will be hereinafter described, and, our basket is now loaded with purged sugars, I will describe the adjustable timing device to predetermine the time the sugar shall remain in the basket with the bottom up and sealed. In Figs. 2 and 3, 11 is a spur gear carried on shaft 10, 12 is a spur gear supported on shaft 23, the said shaft 23 being supported on the main bed plate of the machine in any practical way such as bearings shown in horizontal section, Fig. 13. The spur is rigid with the shaft 23, as already mentioned this shaft 23 carries a dog holder 13, this dog holder, a dog 14, the said dog being normally held against a pin 32 by a spring 30, Fig. 14, only, 40 is a shaft carrying an indicator finger 41, and being held thereto by an adjusting screw 67. This permits of the finger being adjustable to any degree of the circular disk which the face numerals predetermine, as shown in Figs. 3, 10 and 11. 38 is a spur gear also fixed to shaft 40, 37 an intermediate spur gear and 36 a pinion gear carried on shaft 24. This pinion is held by key fixed to gear so as to rotate with shaft.

29 is a worm wheel of small pitch of teeth, say 180 teeth. The worm wheel 29 carries a spring pin 30', already referred to, said spring pin radially coinciding with a series of holes in the disk 28, see Figs. 2 and 3. This disk 28 and the spring pin 30' form a clutch each of which becomes in effect one of the two jaws, or interlocking members thereof. 26, Fig. 13 is an annular clutch groove. This groove is connected by an intervening sleeve with the hole carrying disk 28. A pin, 27, preferably two pins in arm 108 of the bell crank 108—17 is held in the annular groove 26. 112 is a chain drum fixed on shaft 24 and 110 is a chain on said drum, 109 a weight on said chain, Fig. 2 only. The worm wheel 29 is free on the shaft 24 and the shaft can rotate independently of the worm and likewise the worm wheel independently of the shaft. The clutch jaw 28, however, is held to the said shaft 24 by a key 34, Fig. 13, therefore, the said clutch jaw rotates with the shaft 24. The key 34 permits of a longitudinal movement of the clutch jaw 28 and its integral groove 26, however, it will thus be seen that the shaft 24 is under the influence of the weight 109, on cord 110, when the jaws 30' and 28 are disengaged; and as the spur gears 36, 37 and 38, shaft 40 and finger 41 are all, at all times, operatively connected, the weight will, at any time the clutch jaws 30' and 28 are separated, pull the shaft 24 to its normal position, which position contemplates the said weight resting on its support 111, Fig. 2 only. The parts are so adjusted that when the weight is on its support 111, the finger 41 is at zero, as shown in Figs. 3, 10 and 11. We will now assume that I am treating a syrup that requires five minutes to purge; I place the finger 41 at the radial line 87, Fig. 11 which position indicates that it will take five minutes for the said finger to travel from radial line 87 to 0 on the diagram, after which the basket bottom will be sent down. When I set the finger 41 I first free the screw 67 and turn the finger on its shaft 40. Now this predetermines the point at which the finger will always be automatically returned after a purge and when reseated for a subsequent purge time period predetermination. The reseating of the finger is accomplished by the weight 109, Fig. 2. As this weight is raised by the rotation of the shaft 24, the finger 41 rotates until it has its predetermined movement and when the mechanism is unlocked by the unlocking of the clutch jaws 30' and 28 the weight 109 drops to its normal position of rest on its cushioned support 111, and through gears 37, 38, 39 and shaft 40 finger is again put in line 87, or five minutes from 0 in a normal action of the machine. This finger can be set for any time period for purging. Numeral 1 indicates a one minute purge; 2 a two minute purge, and so on. I am not limited to any time predetermination. I could even change the gear combinations to shorten or extend the time on a single indicator dial, as practical requirements may suggest.

It will be remembered that clutch jaws 97 and 98 are always disengaged when jaws 30' and 28 are engaged and vice versa; jaws 97 and 98 are always engaged when 30' and 28 are disengaged, and while the machine is working one or the other of these clutches is engaged. It will also be remembered and understood that whenever jaws 97 and 98 are engaged and shaft 10 is in action purging never takes place, and it will be further remembered that when jaws 30' and 28 are engaged purging always is taking place as this is the time predetermining clutch for purging and for purging alone.

I have now described how I unlock jaws 97 and 98 after basket bottom is raised and how simultaneously with unlocking these basket moving clutches at the conclusion of loading the basket, I lock the timing mechanism clutch 30' and 28. I have also described how the time finger 41 is connected with the shaft 24 and how it automatically reseats itself after its predetermined motion of rotation is finished in each cycle of its movement. I have yet to describe how this time finger controls the mechanism to stop itself and start the basket bottom down by changing the clutches. That is unlocking jaws 30' and 28, which operate the time finger 41 and locking jaws 97 and 98 which operate the basket bottom vertically and the other described elements. In describing this mechanism, inasmuch as the same is used for the unlocking of clutch jaws 97 and 98, I will be excused from repeating some elemental relations.

The finger 41 carries an arm 42. While this arm 42 is shown as being integral with the finger, I could use it, and indeed prefer to use it separated from the finger, in which case a lug on the finger would engage the arm at a given point of rotation and thus carry the arm with it. They are supported on the shaft 40, being adjustably held thereto by a screw 67, Figs. 7 and 13. This arm and finger are shown in detail in Fig. 12. 45, shown in detail in Fig. 8 also shown in Figs. 7, 11, 1, and 13, is a clutch tripping element or lever. It carries an inward projecting lug 47 and an outward projecting lug 46. It is held by pivots 48 to a collar 49, as previously mentioned, the arms 51 and 52 of the said lever forming the pivotal supports for the pins 48, 48 which hold it to the said collar. The said collar 49 is loose on the shaft 40 the shaft can, therefore, rotate while the collar and the lever 45 are stationary. 59, Figs. 13, 7 and 2, is a small arm. This arm is fixed to a shaft 58 and the said shaft is journaled into hole 38' Fig. 11, of the bell crank arm 54—57. The arm is on the outer side of the bell crank clutch shifting element 54—57 and when the arm 57 is in the position indicated by the radial line 123, Fig. 9 the arm 59 is in the path of the vertically positioned dotted lines 122. The dog 81, Figs. 6ᴬ, 7, 13, etc., moves in the path indicated by these same dotted lines. 62ᴬ is also an arm fixed to the shaft 58 and on the inner side of the bell crank 57—54. 61 is a stop pin carried by the latter arm and limiting its movement in the direction of the spring. It does this by resting against the radial wall of the hole in the bell crank 57—54. 60 is a spring and 63' a pin holding the spring. The tension in this spring holds the arms 57 and 62ᴬ normally with the pin 61 resting on the wall of the slot aforesaid. These two arms 59 and 62ᴬ are best shown in Fig. 9 and this figure must be taken in connection with Figs. 13, 7, 2, 1, etc., as is evident. 79 is a vertically reciprocating rod in continual action, the eccentric disk 55, Fig. 6ᴬ being fixed to the shaft 6 and the said shaft, being in continual rotation while the machine is working. 68 is an eccentric strap carrying a link 71. This link is fixed at 76 to the eccentric strap aforesaid and is held by a pivot 77 to the dog holder 78. 79 is a rod carried in guide M⁷, in or on the standard 1, Fig. 6ᴬ, the said guide being a hole in the frame 1. 81 is a dog on the outer side of the dog holder. 86 is a pin in the dog holder arresting the movement of the dog 81 and 83 is a pivotal supporting pin therefor. As the dog holder 78 moves down the dog 81 will have no effect on the lug 47, if in its path, as shown in Fig. 6ᴬ. As it moves up, however, it will pull the lug 47 with it, when it is free to engage therewith. 80 is an inner dog carried by the dog carrier 78. It is also supported on the pin 83, see Fig. 7. 85 is a stop pin carried by the dog holder 78 for the dog 80. It will be noted that dog 80 is free to act in a direction contrary to dog 81, or on the downward movement of the dog holder 78 and its operating connections. 43 is a dog on arm 42, shown in Figs. 6ᴬ and 7, with a stop pin 44 for said dog. I show this as a modification, but I prefer in practice an integral lug on the arm 42, as shown in Figs. 11 and 12. In Fig. 6ᴬ, 69 is one of the arms of the clutch shifter 54—57 and straddles the clutch 55. The plane of arms 57 and 69 is the same, therefore, I do not show it in other views. In Fig. 10 the pin 72 is engaged in annular groove 73 to control the movement of the clutch jaw 97. I do not designate this pin in other views, as it is so well known. 62 is a spring, Figs. 7, 2, 13, etc., fixed to the lug 64 of the shaft bearing 40, at one end and at the other to the lever 45. The end of this spring passes in the arc shaped slot 56 of the clutch shifter lever 54—57, as shown in Figs. 7 and 9. In the arm 54 of the bell crank 57—54 the slot 56 permits the terminal of the said spring to pass therethrough and to pull the oscillating lever in contact with the arm 54 at all times; this slot, being concentric with the pivotal support of both the lever 45 and the said bell crank 54—57, permits the said bell crank to move without any effect on the spring and where the lever arm 45 is moved the spring 62 is free to move with it and oscillate in the said slot 56. The function of the spring 62, therefore, is to keep the lever 45 in close contact with the outer face of the arm 54 of the bell crank 54—57 and when the lug 47 of the lever 45 is oscillated to the position indicated by radial line 93, Fig. 11, to snap the said lug 47 in the hole 53, of arm 54 of said bell crank 54—57, in which position it is engaged by the dog 81, in moving arm 57 of the clutch, as will now be functionally described.

Having now described the details of this clutch changing mechanism its operation is as follows; Figs. 8, 9, 11 and 12 must be taken in connection with Figs. 2, 7, and 13 to correctly understand this operation. Radial lines 75 in Fig. 10 and 123 in Fig. 9 shows the position of arm 57 when the clutch jaw 97 is closed, or when the basket bottom is moving, or syrups being put in basket, as already set out. Lines 74 and 124 represent an open condition of the clutch jaw 97, or when the timing mechanism is in action. Shaft 40 carries collar 49 free, as already set out, and lever 45 is carried by the said collar it will be remembered, 54—57 lever is also carried by shaft 40 free, that is the shaft can rotate without rotating clutch lever 54—57, Fig. 7. 53 is a hole in arm 54 designed to admit lug 47 of lever 45 when the hole and lug coincide positionally. As already set out the finger 41 and arm 42 are fixed, by adjusting set screw 67, to shaft 40. Now the dog carrying rod 79 and the dog carrier 78 are in continual vertical reciprocation and the dogs 80 and 81 are therefore, continually moving up and down on the inner face of the part 54 of the clutch shifter 54—57. Now we will, as previously, assume that the timing mechanism is set for five minutes. The finger 41 is then at line 87 in Fig. 11, and the arm 42 with its lug 43 would be between 7 and 0 (these parts in action rotate in the direction of the arrow, Fig. 11) 94 is a stop pin for the lever 45, Fig. 11, and 91 a spring holding 45 against this pin. When in this position, as shown, in Fig. 7 in dotted lines, the lug 47 presses against the outer face of the part 54 of the clutch and is disengaged from the aforenamed hole 53. Immediately on the clutch jaw 97 being disengaged from jaw 98, as described hereinbefore, and the jaws 30′ and 28 becoming engaged, as also set out previously, the shaft 40 will slowly rotate and finger 41 will also rotate until arm 42 reaches position of radial line 92, at which point the dog or lug 43 of arm 42 engages lug 46 of lever 45, best shown in Fig. 7, and oscillates it from radial line 92 to radial line 93, and when arm 42 reaches position 93, finger 41 is at 0 and the five minutes has expired. Immediately spring 62 will snap lug 47 of lever 45 in hole 53 of part 54 of clutch moving arms 54—57, or from the dotted line Fig. 7 to solid drawing same figure, whereupon the dog moving in path 122, Fig. 9, will engage on the under side of said lug 47 and swing the arms 54—57 so the radial slot 53 which now carries the lug 47 will be thrown from radial line 95 to radial line 96, Fig. 9, and jaw 97 will be thus engaged with jaw 98, and the basket bottom on the shaft 141 will move down as fully hereinbefore set out, by cam 122 on shaft 10.

I have already described how I move bar 15, bell cranks 16 and 108—17 and how I throw arm 62ᴬ in the path of the downward acting dog 80; for, it will be remembered, as soon as lever 45 is moved by rod 63 so the lug 47 passes out of hole 53 of the clutch arm 54, Fig. 13, the spring 91 will snap the arm 45 against the arm 59 and through the common supporting rod 58 snap the arm 62ᴬ in the path 121 of the moving and downward acting dog 80, and as this dog moves down to its limit when so striking the arm 62ᴬ it oscillates the arm 57 from line 123 to line 124 and opens clutch jaws 97—98 and the basket shaft 141, molasses gates and spraying mechanism are all arrested, shaft 10 being stopped.

I have yet to describe how I desengage clutch jaws 30′ and 28 as 97 and 98 are engaged. This I accomplish as follows:—In Fig. 14, 101 is a depending lever or bar pivoted to a support on the frame 1 at 103, support not shown. 100 is a link having a slotted end at 102 and pivoted to said lever 101; 99 is a projection on the sleeve end 66 of belt shifter 54—57, which engages the link 100. 106 is an adjusting lug to be used or otherwise. Now, Fig. 14, as the jaw 97 is put in contact with 98 by arm 57 the depending projection 94 is oscillated radially to the angular position of the dotted line projected radially from the center of shaft 40 in Fig. 14. Now as arm 107, Fig. 13, of the double bell crank 17—108—107 is engaged by this movement as shown the arm 108 will be oscillated from line 27′ to normal or as shown in the solid drawing Fig. 13 and the jaws 30′ and 28 will be disengaged simultaneously with the engaging of the jaws 97 and 98 through the oscillation of the arm 57 from line 124 to line 123 in Fig. 9. I have already described how I rotate shaft 23 and through dog holder, Figs. 14, 13, the supported dog 14 will engage the end of the link 15 and through bell crank 16 move rod 63 and trip lever 45, thus putting into operation the mechanism which unlocks the basket bottom moving clutch jaws 97 and 98; and how simultaneously jaws 30' and 28 are united.

It will be noted that I show a slot in link 15. This slot is to insure the rod 63 moving the lever 45 slightly in advance of jaw 28 as the movement of the rod 63 must be greater than clutch jaw 28. Now after the clutches aforenamed are thrown into and out of action respectively by the said link 15 and the shaft 23 is stopped the dog 14 rests rearward of, but still engaged with the said link 15. This is substantially in a horizontal position and is indicated by horizontal line $M^2$. The normal position of the dog 14 before it contacts with the end of the link 15 is as shown in solid drawing Fig. 14, or resting against the pin 32. No movement will be given to the bar 15 until the dog 14 is oscillated against pin 31, as the spring 30 is not strong enough to move the said bar 15, but the moment the dog 14 strikes pin 31 in dog holder 13, shown only in Fig. 14, then the link 15 will be moved operating the bell cranks 16 and 108—17 as fully described. The shaft 23 and dog holder 14 are now at rest with the dog 14 in the position of the dotted line and resting against the end of link 15. Now it would be impossible for me to start the machine again until I unlocked link 15 or raised it out of the path of the rotating dog 14. This I do as follows: 25 is a pivoted lever having two pins 29' 29' which engage link 15. This lever is shown in Fig. 13 as pivoted into an integral lug on the main bed plate 1. 22 is a cam carried by the shaft 24 and made a part of the chain drum 112. After the clutch jaws 30' and 28 are united, as set out, the shaft 24 and chain drum 112 with cam 22 rotates and as the cam 22 contacts with the lever 25, which it does on rotating, the said lever is oscillated and the link 15 is raised at its dog contact end and takes the position indicated by dotted line $M^3$, or that shown in Fig. 14. This raise is sufficient to permit the dog 14 to be snapped under the link 15 by the tension in the spring 30 and there it rests until the clutch jaws 97 and 98 are again united on prime shaft 6 and move shaft 23 forward rotatively for the next dropping of the basket bottom, through worm wheel 8, shaft 10 and cam 122 thereon. As the shaft 23 is rotated in the direction of the arrow 33 the dog 14 on its carrier 13, after the said shaft has traversed 360°, will contact with the end of rod 15 and on so contacting the said shaft 23 and dog 14 will continue to rotate until the rod 63, through bar 15 and bell crank 16 has forced lever 45 to the position shown in Fig. 13 and the radial line 113; immediately the spring 91, Fig. 2, will snap the said lever against interponent 59 and as interponents 59 and $62^A$ are both rigid on the same shaft 58, and as interponent 59 is by this means oscillated 58 and $62^A$ are likewise oscillated, and by this oscillation $62^A$ is brought in the path of the descending dog 80, Fig. 13, and as the rod 58 is journaled into clutch arms 56 and 57, the said clutch arms are thus oscillated and jaw 97 disengaged from jaw 98 and the rotary motion of worm 7, worm wheel 8, shaft 10 are arrested. Simultaneously clutch jaws 28 and 30' are engaged and cam 22 on chain drum 112 is rotated and oscillates arms 25 and 15 to the position shown in Fig. 14, or to line $m^3$, in which position dog 14 will snap under said bar 15 and there remain until the time predetermined for purging has expired and the clutches are again changed, as has been fully hereinbefore set out. The object of leaving the dog 14 rest under the rod 15 is to have it in position to again rotate 360° before the said rod need again be moved. As this contacting of the rod 15 by the dog 14 is only once in the cycle of the machine, which cycle contemplates the basket being loaded, the load being timed for purging, the solids being unloaded from the basket and basket being returned to its normal raised position for another purge. All these features will be made more coherent in describing the operation of the machine in going through its complete cycle.

In Fig. 14 the dotted lines indicate the position of the dog 14 after the slack is taken up and the solid drawing indicates the position taken by the dog after the rod 15 is raised. This slack is important as the machine cannot become locked at this point against rotation by reason thereof. While I show a rounded end 19 on bell crank 16 I do not limit myself to this structure, however, the increased section of the link 15 where the end 19 of the bell crank 16 engages the link 15 permits the link to be raised without disengaging their operative position. The pin 18 and rounded head 19 are loosely fitted to permit of the lever being oscillated from line $M^2$ to $M^3$ without strain, and with 18 as the pivot point.

*Spraying the sugar.*—Returning now to the spraying of the sugar, Fig. 24, 218 is a spraying nozzle, 219 a pipe leading thereto and 220 a plunger chamber, plunger not shown, 221 is the rod carrying the plunger, 222 is the lever carrying said rod being pivoted together at 223. 224 is a pivot support for lever 222. 225 is the arc described by the end of the lever 222. The radial line 226 shows the movement of the lever 222. In Fig. 24 while the cam roller travels from J to K, immediately proceeding the downward motion of the basket bottom and cleaner, the pin 228 will move the lever 222 from the position shown in the solid drawing Fig. 24, to that indicated by the dotted line 226. Meanwhile, the plunger rod which carries a piston in chamber 220 will spray the sugar as shown in this view and the pin 228 will have cleared the end of the rod 222 simultaneously with the friction roller 127 letting down basket and cleaner as fully set out. The lowering of the basket, the holding of same down and the raising thereof in the machine consumes 270 degrees of the cam revolution. The feeding of the molasses or syrup 40 degrees. The unlocking of the clutches 12 degrees and the spraying of the sugars to clarify, 18 degrees. These functions can be contracted in degrees or can be extended to suit any requirements or conditions. It can be done by changing the high side of the cam or by changing the pin 228 in its position from the center of the cam carrying shaft. In Fig. 25 I show the manner in which I could construct a movable pin for controlling the molasses and water jet feed. It consists of a lever 230, pivoted to the disk 124 at 231 having an arc shaped slot 233, with a lock nut 234 on slot 235. The radial lines 236 and 237 show variable positions for this lever or arm. The slot 236 can be made of any length to suit practical needs or requirements. This I have shown in Fig. 1 and it is mounted rigidly on shaft 10. By this variable means I can accurately predetermine the amount of molasses I need for a purge and it will give the same volume until I change the adjustment. In the manufacture of sugar this variable feed of material in connection with my device for predetermining a time period for which material shall remain in the basket and my ability to vary this predetermination to meet any practical requirement, enables me to automatically handle sugar laden syrups in a thoroughly practical manner and effects great economies in the art.

*The operation of the machine.*—Inasmuch as the functional relation of the elements forming the different mechanical groups has been described and set out in explaining the construction of the machine, some repetition will be inevitable in describing the complete cycle of movement comprehended in the operation of the machine.

The first essential in the operating of the machine is to determine the time it is necessary to leave the material in the basket for an effective purge. Having determined this necessity and assuming the material we are about to treat requires a 5 minute period we set the finger 41, see Figs. 12, 11 and 2, to the radial line marked 87, Fig. 11.

The arm 42 being integral with 41 is oscillated to a similar degree on the dial 89. It is only possible to oscillate this indicating finger toward the consecutive numbered figures on the dial 89 when the finger is at 0, as arranged progressively, that is toward 1. 2. 3. 4., &c., &c. As has been described this indicating finger 41 is free on the shaft 40 and is only locked thereto when the set screw 67, Fig. 7, is tight. Therefore the first act in setting the finger is to free the screw 67, or some equivalent locking means, and then turn the finger 41 and its co-united arm 42 on disk to numeral 5 as stated. Each of these numeral spacings on the dial represent one minute of time as necessary for the finger 41 to traverse, and, therefore, when I set my finger at 5 on the dial it will take it 5 minutes to travel to 0, as in the action of the machine this finger travels from the higher to the lower number. The entire mechanism is for the moment idle and I put the belt (not shown) from the loose to the fast pulley on prime shaft 6. When the machine is idle, it is good practice to have the bottom 142 of the basket down, as shown in Fig. 4, in which position of the bottom the cleaner lever 185 and the basket bottom controlling lever 125 are in the position shown in Fig. 2. I now engage clutch jaws 97 and 98, which, be it understood, are hand controllable as well as automatic in their control, and, if the basket bottom is down and these said jaws are disengaged; they must be engaged before the bottom 142 can be raised. The closing of these clutch jaws and the belt shifted from the loose to the fast pulley on prime shaft 6 rotates the worm wheel 8 through worm 7 which worm is rigidly carried on the sleeve extension of clutch jaw 98. As the worm wheel 8 rotates normally and only in the direction of the arrow 9 the shaft 10 likewise so rotates, the former being keyed to the latter.

The cam 122 through friction roller 127 raises lever 125 and through links 129 and shaft support 133 the bottom of basket 142 is raised. Simultaneously with this action the end 189 of lever 185 through link 187 pins 188 and 186 holding said links respectively to arm 189 and lever 125 will raise rod 176 through links 184 and interposing rod lifter 181, 181′, Fig. 2 only. As the cam 122, Fig. 24, continues to rotate with shaft 10 it reaches the position indicated by C. This figure is diagrammatical and the rollers *c. b.* and *a.* we will consider as representing different positions of the said cam on friction roller 122. The disk 124, Fig. 24 is also carried on shaft 10. This disk carries a pin 228 when the cam 122 is at *c.* the pin 228 engages the arm 229 of the bell crank and oscillates arm 231 thereof and through link 232, Fig. 1 opens the syrup gate 235 and permits the syrup to flow in the centrifugal basket, as clearly illustrated in the dotted line syrup conveyer in Fig. 1.

When the cam 122 strikes radial line K the basket is raised and immediately the pin 228 will open the syrup gate 235, as described, and while this pin 228 travels to its radial line marked 2nd the basket is loaded with a proper amount of syrup for a purge, and as the pin 228 leaves the end 229 of the lever whose arm 231 operates the gate 235, through link 232, as set out, the spur gear 12 on shaft 23, through spur 11 on said same shaft 10 will have moved dog holder 13 on said same shaft 23, sufficient to have not only taken up the slack indicated in Fig. 14, but in addition the arm 15 will have been engaged by the dog 14 and moved in the direction of the moving dog, but in a rectilinear path, until the bell crank 16 will have forced the lug 47 of the lever 45 from the hole 53 of the clutch moving arm 56—57, whereupon the reciprocating link arm 71 on the eccentric 68, which reciprocates continually, vertically, the dog holder 78 and dog 80 on its downward movement, will engage the interponent 62$^A$ of the shaft 58, held to arm 56 of the clutch disengaging member 57—56 and thus oscillate and unlock the clutch jaws 97 and 98 by sliding 97 away from 98 on the prime shaft 6 (best shown in Fig. 2).

I have already, in describing the construction of the machine, fully set out how spring 91 will snap arm 42 down against interponent 59 of rod 58 journaled in arm 56 and oscillate the rod 58 to its predetermined limit of movement, which brings the said inner interponent 62$^A$ in the path of the vertically reciprocating dog 80, that the above result will be accomplished. All this; that is the moving of the lever 45 downward, its engaging with the outside interponent 59, the oscillating of the rod 58, the bringing of the interponent 62$^A$ in the path of the downward acting dog 80, and the swinging of the arms 56—57 in opening of the clutch jaws 97—98 is accomplished instantly. The eccentric 68 is keyed to the prime shaft 6 and is in continual reciprocation, making 75 revolutions per minute and all this is accomplished substantially in one revolution of this shaft, as soon as the rod 63 has forced the lug 47 of the lever 45 from hole 53 of arm 56 of clutch mover 56—57. One second of time is sufficient for these movements and results. Simultaneously with the unlocking of the clutch jaws 97 and 98, and the arresting of the rotary movement thereby of the worm 7 and worm wheel 8, the bell crank 17—108 is moved and the clutch members 30' and 28 become locked thuswise together. Now worm 35 and worm wheel 29 are in continual rotation, the former being keyed to the prime shaft 6, therefore when the member 28 of the time clutch is locked to part 30', the shaft 24 will rotate the clutch member 28 being fixed to said shaft and 30' being free on said shaft. Pinion 36 is also fixed on shaft 24 and rotates with it, intermediate gear 37 and gear 38 are operated by said shaft 24. Shaft 40 carries the timing finger 41 and the integral arm therewith 42; therefore as soon as the clutch locking members 28 and 30' are engaged the finger 41 will commence to rotate from the numeral 5 where we set it at starting toward 0. This locking of clutch member 28 to 30' is accomplished simultaneously with the unlocking of clutch jaws 97 and 98. These latter clutch jaws are unlocked when the basket is raised and is loaded with its fill-mass for purging and as the former control the period for purging this time is counted immediately on the raising and filling of the basket. Simultaneously with these results, as the basket is raised to its limit, the belt on section 173 of the pulley on the basket shaft is placed on section 172 which brings it taut and gives high speed to the centrifugal basket: i. e. its purging speed. The basket is now purging its load of fill-mass and the finger 41 has been set to keep this purging speed for 5 minutes time.

When the basket was raised and filled with syrups, and the clutch jaws 97 and 98 unlocked, clutch 28 and 30' locked and timer shaft 40 starts we leave the dog 14 in the position shown in Fig. 23. The arm 15 is also in this position as the timer starts to record the time for purging. Now it would be impossible for shaft 23 to start rotating again in this position, so, as the shaft 24 rotates, the cam 22 on the chain drum 112, Fig. 14, will engage controlling lever 25 and tilt it and, as this lever supports the one end of lever bar 15 by pins 29', 29', this tilting swings lever 15 from radial line $m^2$ to line $m^3$ whereupon spring 30 will snap dog 14 under lever arm 15, as shown in Fig. 14, and shaft 23 is ready to again rotate in the direction of the arrow 33 as soon as the material in the basket is purged for 5 minutes as predetermined. The 5 minutes has now about expired and the finger 41 has traveled to 0 and the arm 42 its integral companion through the lug 43 thereon, has engaged the lug 46 of arm 45, Figs. 7 and 13, and oscillated the said arm 45 from its position of resting on the interponent 59, where we left it, and carried it upward until the lug 47 thereon positionally coincides with the hole 53 in arm 56 of clutch moving member 56—57, whereupon the spring 62 will snap it in said hole. It will be remembered the dog holder 78, through its operating link 71, is in continual vertical reciprocation at a rate of 75 vertical movements per minute, so immediately on said lug 47 passing in and through the said hole 53 it will be engaged by the upward acting dog 81 catching on the under side of said lug 47 and oscillating lug 47, its lever arm 45, arm 56 to which said lug 47 and said lever 45, through said lug, is locked, and, through arm 57, integral with 56, close clutch jaws 97 and 98 and worm 7, worm wheel 8, shaft 10, cam 122 are again ready to rotate in the direction of arrow 9. This rotation will be at high speed of the basket and this high speed will continue for say 40° of shaft 10$^s$ rotation, or while the basket cam moves from line I to H, Fig. 24. When we stopped the vertical movement of the basket, it will be remembered pin 228 on disk 124 was in 2nd position in which position it rested on the under side of forward end of lever 222. As the cam 122 travels from I to H with basket up and at high speed, the lever 222, through pin 228 of disk 124, through link 221 operates spraying pump 220 and forces water through pipe 219 and nozzle 218 on to the sugars in the basket and after the cam 122 has rotated to line H, the spraying will cease and the basket bottom 142 will descend by shaft 141 being forced down by lever 125 and cam 122. The basket descends by gravity, having when loaded and with its own weight, about 800 to 1000 pounds weight. In the descent of the basket the belt will pass from 172 to the contracted diameter 173 of the belt wheel on the shaft 141 and the speed of the basket will be reduced from about 1000 to 100 R. P. M., at which speed it is unloaded of its purged sugars or of whatever substance it has just purged.

Simultaneously with the locking of the clutch jaws 97—98, I unlock the clutch 30'—28 as follows: In Figs. 14, 27, 26 is shown a depending arm or lug 99 integral with or fixed to clutch arms 54—57 or the spool end thereof. Now as the arm 57 moves from radial line 124 to 123, Figs. 8 and 27, being the same as radial lines 74 and 75, Fig. 10, the end of the lug 99, being held in channel or groove formed by lugs 102, 102, Fig. 27, of the link 100, and this link being pivoted to pendant lever 101, the said link will oscillate said lever 101 from radial line R to R' and the set and thrust screw 106, being carried on lever 101, will engage the end 107' of arm 107 of bell crank 107—108 and oscillate said arm 107 from radial line R$^2$ to R$^3$ which will oscillate its co-arm from 27' to R$^4$, Fig. 26; while this is being done bar 15 through arm 17 of the said bell crank will be moved back on top of dog 14 and oscillate bell crank 16 and therethrough rod 63 which it carries and controls disengaging the said rod 63 from the slot 56 of the clutch moving arm 54—57. It will be seen, therefore that rod 63 and bell crank 17—108 are always moved in exact unison and by the same element. While the finger 41 is moving from numeral 5 to 0 the weight 109 through cord 110 and drum 112, Figs. 2 and 13, is raised off the weight support 111 and when the finger 41 has reached 0 and the clutch 28—30' is unlocked as described this weight will rotate pinion 36, shaft 24, clutch number 28 through its sleeve held to shaft by 34 key intermediate gear 37, and spur 38, shaft 40 and finger 41. The weight thus resets the finger back to numeral 5 and the timing mechanism is ready for the next operation. The weight support 111 is not essential, and merely prevents a strain on the cord 110 in reseating the finger 41 automatically.

I have now described the entire series of operations in the cycle of the machine except the lowering and the cleaning of the basket, which we have left, it will be remembered, loaded with purged sugars and already washed or sprayed. As the basket bottom 142 descends with the basket wall 149 the basket is lowered on balls 161 on which it rotates while at slow speed for unloading the sugars. In this movement the basket perimeter is lowered from line 171 to 170 after which movement the basket wall is held on said balls, but the bottom continues to descend to the dotted line shown at 148, Fig. 4, and in this position it has passed the holes 157, 157 for sugar egress shown in Fig. 15. The bottom is now down to its limit and the sugar is free to pass out of basket by centrifugal force if it is put in the horizontal plane of the said holes, but it will not drop from the wall of the basket unaided, even at slow speed of basket; so I discharge the basket of its purged sugars as follows: The levers 185 and 125 move, as described, in unison and as the latter lowers the basket shaft 141, the former lowers the cleaner 213 on shaft 176. When the basket bottom is down the cleaner is also down and this cleaner 213 as it reaches its lower limit of movement is in position marked 5th, Fig. 5. The cam 122 is now rolling on friction roller 127 at the small radius of the said cam and the circumference of the cam during this movement is of uniform radius, keeping the part it operates stationary. During this movement of cam 122, cam 123 through bell crank 196, link 198, rack 200, connecting said link and bell crank, will move the rack meshing into spur gear segment 193 on vertical cleaner carrying rod 176 and rotating the rod 176 and its cleaner and frame 213 to 1st, 2nd, 3rd, and 4th positions, Fig. 5, and thus gradually removing the wall of sugar from its contact with the side of the basket, and deflecting it downward by deflectors 207, 207, 207—207 on stem 206 carried by said rod 176, and as the sugars reach the basket bottom they are thrown off therefrom by centrifugal force, gently at the slow speed of the basket and pass from the basket section of the machine as shown in Figs. 18 and 19, &c., into lower part of machine. The cam 122 remains rolling on the roller 127 until the rod 176 has moved the cleaners 213 + to position marked 4th, Fig. 5, and back again and as it reaches in its rearward rotation the initial or 5th position, cam 122 raises the basket bottom through shaft 141 and the cleaner shaft 176 up to the limit of their raised positions where the basket is again loaded as has been fully described and all the operations repeated as set out.

While my timing and automatic features of this machine are set out as purging a fillmass for sugars I do not limit myself to such use. It is equally designed to purge highly saturated material not viscous in nature in which case I would feed the machine at high speed and set my timer to suit requirement of purging in such a way that after a predetermined flow of the highly saturated material sufficient to make a wall of purged material to practical maximum thickness on the inner basket surface, I would then have the timer cut off the flow, simultaneously with lowering the basket and start its flow with the raising of the basket to maximum. I of course will leave this specific construction for a future application, but note its correlation with the present invention.

Some of the filtering functions to be accomplished of a highly saturated nature are aluminum powder, of refined aluminum ore, corn products material at present treated in ordinary filtering machines, or in fact any material that can be handled by a filtering machine and is thus pumpable by reason of its high saturation and non viscosity.

I desire it fully understood that I do not limit myself to specific structure in any particular. I could make many modifications without departing from the spirit of my invention. Instead of mounting the basket cleaner on a vertical shaft I could oscillate it on an external pivot swinging it into the basket and out, as desired. I could also make many forms of timing mechanism but these modifications would but accomplish the same purpose and of the many possible ways I think my specific structure the best. My claims I lay broadly for fundamental protection.

Having now described my invention, what I claim as new and desire to secure by Letters Patent is:

1. A centrifugal having a basket composed of two parts, one of the said parts forming the bottom of the basket the other the filtering chamber having a cylindrical wall, a shaft supporting the said bottom, means for rotating the said parts, automatic means for moving the said bottom downward independent of the cylinder at a predetermined period, comprising a prime shaft, a secondary shaft, and a connection between the said bottom and the said secondary shaft, means to predetermine this period, and automatic means to clean the bottom after the bottom has been thus moved.

2. A centrifugal having a basket composed of two parts, one of the said parts forming a bottom for the basket, the other the basket filtering chamber, means for rotating the said parts, a shaft supporting the said bottom, means for reciprocating the said shaft and bottom vertically, means for locking the said bottom to said basket in their horizontal relation, but means to permit said bottom to reciprocate vertically for a predetermined distance in its relation to said basket.

3. In a centrifugal for separating liquids from their associated solids and adapted for continuous rotation the combination of a basket having ports for the passage of solids, said ports normally closed, means for feeding material into the said basket, a bottom for the said basket, said bottom forming a support for the said material during purging or draining, means for temporarily opening the said ports and means for putting the solids after drained on the said bottom so as to permit them to pass through the said ports, when temporarily opened, by centrifugal force.

4. A centrifugal having a purging basket wall, a bottom for said basket, a support for said basket independent of said bottom comprising a bearing exterior to the basket on which the said bottom wall is supported at the time predetermined, means for cleaning the said basket automatically after purging comprising mechanism for moving the bottom from its normal position, in which changed position purged solids are carried below the horizontal purging zone of the basket and placed on the bottom and passed therefrom by co-acting devices and means and during which time the basket wall is supported on the said external bearing as per the time predetermined in the cycle.

5. The combination in a centrifugal of a basket having a cylindrical filtering wall, a bottom for said basket, a vertical shaft by which said bottom is actuated, means for rotating the said shaft, means for moving the said shaft and the said bottom vertically at a predetermined time, means to predetermine this time and means to regulate and vary the time between purging and bottom vertical reciprocation.

6. A centrifugal having a basket composed of a filtering wall, a liquid collector or chamber surrounding the said basket and filtering wall, means for supporting the said basket on or to said outer liquid collecting chamber at some point, a bottom for said basket, means for rotating the said bottom and basket, means for supporting the said bottom independent of the said support for the said filtering wall and mechanical means for moving said bottom reciprocally within the said basket while the bottom and basket are rotating.

7. In a centrifugal the combination of a basket, means to feed the basket, means to rotate the said basket, means to support the basket at one period of its rotation externally, a bottom for the said basket, a shaft on which the said bottom is carried, a bearing support for the said shaft and means for reciprocating vertically the said bearing support and therethrough the said shaft.

8. A centrifugal machine having a basket composed of a cylindrical filtering wall, a support therefore, a shaft to which said wall is concentric, a basket bottom carried by the said shaft, means for automatically changing the position of the basket bottom in its relation to the filtering wall and lowering it at a predetermined time, means interposed between the bottom and the filtering wall to raise the latter by the former at a predetermined time wherethrough the said shaft becomes the support for the filtering wall, as set out.

9. A centrifugal having a basket composed of a filtering wall, a shaft, a bottom for said basket, automatic mechanical means to drop the bottom, independent supports for said basket and shaft, said supports acting at predetermined times in the cycle of the machine, the former supporting the said basket during cleaning of the said basket and the latter supporting the said shaft at all times and means for automatically cleaning the basket while the said basket is supported on its bearings.

10. In a centrifugal machine having a basket in combination with an independent support for the said basket, a bottom for the said basket, an independent support for the said bottom consisting of a shaft on which said bottom is carried and to which said basket is concentric and a seal interposed between the said bottom and basket.

11. The combination in a filtering machine of a filtering basket, a bottom for the said basket, automatic means for varying the vertical position of the bottom while rotating, means for cleaning the purged residuum from the walls of the chamber while rotating, consisting of a pivoted central stem, a series of inclined blades carried by the said stem and means for oscillating the said stem toward the inner wall of the said basket while cleaning and away therefrom thereafter, as set out.

12. In an automatic centrifugal machine the combination of a basket having an independent movable bottom, means for rotating the said basket and the said bottom continuously, automatic means for moving the said bottom downward independent of the basket, an independent support for the said basket, means for feeding material into the said basket intermittently, means for automatically discharging material from the said basket after purging intermittently after said bottom has been moved, and an independent support for the said bottom comprising a shaft and a shaft support, as set out.

13. In an automatic centrifugal the combination of a basket, means for rotating the said basket, means to intermittently feed material into the said basket, means to intermittently discharge material from the said basket, an indicating device whereby several periods for purging can be visually predetermined, means for operating the indicator during purging and a mechanical connection controlled by the indicator device, between the indicator operating mechanism and the basket, whereby the period for purging can be predetermined.

14. In an automatic centrifugal the combination of a basket, means for rotating the said basket, means to predetermine the period for basket purging comprising an indicator having time units indicated thereon, means to operate the indicator during purging, means to arrest the operation of the indicator after purging and means to clean the basket of purged solids while the indicator is out of action.

15. The combination in an automatic centrifugal of a filtering wall of a basket, automatic means to feed the said basket, a time predetermining device for controlling purging periods, means to permit of various periods for purging; all controlled by the time predetermining device and means to clean the basket of purged solids at any time the purging time has expired.

16. In an automatic centrifugal the combination of a rotary filtering basket, automatic means to charge the basket with material for a purge, means to clean the basket after a purge and means to vary the time between basket charging and basket cleaning, comprising an indicator, a mechanical connection between the basket rotating mechanism and the indicator whereby the basket rotation is controlled and mechanism for varying the position of the indicator and by such variation varying the period of basket rotation.

17. The combination in an automatic centrifugal of a filtering basket, a vertical movable bottom in said basket, means for rotating the basket and bottom, means for predetermining a purging period for said basket consisting of an indicator means for varying the period of indicator action and therethrough the purging period, and a mechanical connection between said indicator and said bottom, said connection moving the said bottom at the period predetermined and automatic means for discharging material from the basket and bottom when the bottom is so moved, as set out.

18. In an automatic centrifugal machine the combination of a filtering basket, means for rotating the said basket at a predetermined purging speed, means automatically operated for predetermining and controlling a period for basket rotation at this speed, means to vary the speed of the basket after purging and means to clean the basket after the speed is so varied.

19. In an automatic centrifugal the combination of a filtering basket, means to feed the basket, means for rotating the said basket at a purging speed, means automatically controlled for predetermining a period for basket purging, means to vary the speed of the basket and means to discharge the purged solids from the basket after the speed is so varied.

20. In an automatic centrifugal the combination of a basket, means to rotate the said basket, comprising a prime shaft and mechanism interposed between the said basket and shaft, an indicator to predetermine and control the purging speed of the basket, means to feed the basket, means to clean the basket after purging, means to reseat the indicator automatically after the purging time as predetermined has expired and means to automatically lock the said indicator mechanism after basket filling to said prime shaft through intervening mechanism whereby the indicator controls the rotation of the basket.

21. The combination in an automatic centrifugal of a basket, means for rotating the said basket, means for automatically feeding material to the said basket for purging, means for spraying or washing the sugars after purging, means for cleaning said basket after purging and washing, means for predetermining a period for purging comprising an indicator having a time unit face of varied numerals progressively arranged and means to automatically operate the indicator by a moving element connected with the basket moving mechanism and hand controlled means to vary the position of the indicator relative to its facial numbers, so various periods for purging can be accurately predetermined.

22. The combination in an automatic centrifugal of a basket, a bottom for the said basket, means for rotating the said bottom and basket, means for feeding the said basket, means to vary the basket feed, means to wash the sugars after purging, means to vary the washing period, means to clean the basket after purging and washing, comprising a speed reducing mechanism for the basket, a bottom moving mechanism and means for passing the solids on the said bottom as a passageway to exit from the basket.

23. The combination in an automatic centrifugal of a basket, means for rotating the said basket, comprising a shaft 141, a bottom thereon 142, a series of projecting arms on the said bottom 146, said arms engaging in coinciding slotted holes in the perimeter of the basket, a bearing for said supporting shaft, means for lowering the said shaft and bottom, means automatically operated and controlled for cleaning the inner wall of the basket of purged material and putting it on the bottom of the said basket and said bottom acting as a shelf in passing the said solids from basket to exit.

24. The combination in an automatic centrifugal of a basket, means for supporting the said basket, comprising friction rollers and a ball race in which they are carried, a bottom for the said basket, means for supporting the said bottom independent of the said basket, means for moving the said bottom independently vertically and a connection between the bottom and the basket wall whereby on a predetermined movement of the former it will raise the latter off the said balls.

25. In an automatic centrifugal the combination of a basket wall, a support for the said wall comprising a bearing exterior to the basket and independent of the bottom support, a bottom for the said wall thereby forming a basket, an independent support for the said bottom and the said wall, a liquid collecting chamber, a solids receiving chamber, a supplemental wall therebetween and a seal telescopically arranged between the said chambers thus preventing the passage of the liquids to the solids or the solids to the liquid chamber.

26. The combination in an automatic centrifugal machine of a basket, automatic means to feed the said basket while rotating, automatic means to clean the said basket while rotating, mechanism automatically controlled to vary the speed of rotation, a bottom for the said basket and automatic means to raise and lower the said bottom at a predetermined point in the cycle of the machine.

27. In an automatic centrifugal the combination of a purging basket, means to feed the basket with material for a purge, automatic means to predetermine the period for basket purging, means to vary this period, and means to lock the said timing mechanism in any of its various positions, means to rotate the basket and means to clean the basket after any of its purging periods.

28. In an automatic centrifugal the combination of a filtering basket, means to pass the drained liquid out of the said basket at the upper portion thereof, means to predetermine the period for liquid draining comprising an indicator, a mechanical connection between the basket operating mechanism and the indicator and means to vary the period for indicator action and thereby the period for filtration and means for passing the solids out of the lower portion of the basket after liquid draining and after the expiration of this said period.

29. In an automatic centrifugal the combination of a filtering basket at different speeds, means for rotating the said basket, means for predetermining high speed periods for the rotation of the said basket, means for feeding the said basket, means for arresting the speed of the basket after the period for high speed has expired, means for giving the said basket a predetermined slow speed, means for cleaning the basket at the said slow speed and means for increasing the speed of the basket after the slow speed period, after filling, to high speed.

30. In an automatic centrifugal the combination of a basket having filtering walls, means for rotating the said basket, a bottom for the said basket and a centrifugally operated seal consisting of a series of arc shaped strips interposed between the exterior of the perimeter of the bottom and the interior of the basket wall and suitable guides for said seals.

31. In an automatic centrifugal the combination of a basket a vertically reciprocating bottom in the said basket, means for rotating the said bottom and the said basket, means for moving the said bottom automatically reciprocally within the basket vertically, means to limit and predetermine the two extreme movements of the bottom within the basket, means to load the basket with fillmass in the one position as predetermined and means to unload the bottom and basket at the other position as predetermined.

32. The combination in an automatic centrifugal of a basket, a variable speed mechanism for said basket, means to maintain said speed mechanism at high speed for purging, a basket cleaning device and means to maintain a slow speed while the said cleaning mechanism is in action.

33. The combination in a centrifugal of a filtering basket, means to rotate the said basket at high speed for purging, means to vary the rotation of the said basket, means for predetermining periods for varied rotations, means to hold the material in the basket while at the purging speed, and means to clean the basket after purging, at the reduced speed.

34. The combination in an automatic centrifugal of a basket, a bottom for the said basket, means for rotating the said basket, means for filling the said basket for purging a fillmass, a time predetermining device for purging consisting of an indicator, means to vary the action of the indicator, a reseating device for the indicator and a basket celaning mechanism, whereby at the expiration of the time predetermined by the said indicator, purging will cease, the basket will be cleaned of purged solids and the indicator will be reseated back to its normal position.

35. The combination in an automatic centrifugal of a basket, a basket shaft, a bottom carried by the said basket shaft, a prime shaft, a connection between the prime shaft and the basket shaft, means for supporting the basket normally independent of its shaft, and means for automatically transferring its support to its said shaft at a predetermined point in the cycle of the machine.

36. The combination in an automatic centrifugal of a basket, means for rotating the said basket at a normal speed for purging, means for automatically loading the basket with material for purging while rotating, a shaft for operating and supporting the said basket at one portion of its cycle, an independent support for said basket for the remaining portion of its cycle, means for transferring the said basket from its independent support to its shaft support at a predetermined time in the cycle of the machine and means to automatically clean the basket while on its independent support.

37. The combination in an automatic centrifugal of a basket, means for feeding the said basket automatically with material for a purge, means for rotating the said basket at a purging speed, means for predetermining and controlling the period said purging speed comprising an indicator, a mechanical connection between the basket rotating means and the indicator and independent hand controlled means for varying the position of the indicator, and means for automatically cleaning the said basket after the said purging is completed.

38. The combination in an automatic centrifugal of a basket, means for automatically varying the speed of the basket, means for predetermining these periods of different speeds, means for loading the basket at one speed, purging the material thereafter at the same speed and then cleaning the basket of purged residuum at different speeds and whereby the loading, purging and cleaning are successively accomplished in an automatic and continuous manner.

39. The combination in an automatic centrifugal of a basket, a bottom therein having a movement longitudinal in the basket, a prime shaft, a basket shaft, a mechanical connection between the basket shaft and the prime shaft, a timing mechanism operated by the said prime shaft through which is controlled the basket shaft and basket rotation, a finger carried by the said timing device, a dial over which the said finger moves and means for initially setting or adjusting the said finger to various points on the said dial.

40. In an automatic centrifugal the combination of a basket, said basket having a perimeter for filtering, an upper and a lower zone for the said basket, the upper zone being the filtering section and the lower zone the solids passage section, a shaft, a bottom for the said basket, said bottom carried by the said shaft, means for locking the said bottom to said basket perimeter but permitting a vertical movement of the bottom independent of the perimeter, exit passageway for solids through said perimeter in the said lower zone and means for passing the bottom to the lower or solids passage zone and means to arrest the vertical movement of the perimeter as the bottom is thus moved.

41. The combination in a continuous filtering machine of a basket having lateral walls, one portion of said wall being a filtering surface for liquid passage during filtration, a further portion being provided with solids egress passageways, a bottom for said basket, said bottom holding the material in the zone of the filtering area while centrifugal action is purging same and means for moving the said bottom to the zone of solids passage after filtration.

42. The combination in an automatic centrifugal of a basket, one portion of the said basket having a filtering area for liquid passage during filtration, a further portion being provided with solids egress passageways, means for holding the material in the liquid filtering area during filtration and means for forcing the purged solids after filtration in the area of the basket having the solids egress passageway, whereby in the one section of the basket the liquids are under the influence of centrifugal action and in the other section of the basket the solids come under the influence of centrifugal force.

43. The combination in an automatic centrifugal of a rotating basket having a liquid filtering outlet in one portion thereof, a solids passageway in another portion thereof, a bottom for the said basket, a shaft supporting the said basket, means for changing the position of the bottom, means to predetermine various positions of the said bottom, whereby in one position the said bottom holds the liquid charged fillmass during purging and in the other position the said bottom acts as a medium for permitting the said solids to pass from the basket to exit.

44. The combination in an automatic centrifugal of a basket, means to operate the basket, means to feed the basket before purging automatically, means to clean the basket automatically after purging, comprising a shelf carried by a moving part of the machine, means to take the solids off the inner wall of the basket and put them on the said shelf as a conveying means from the basket comprising a scraper and a series of co-acting deflectors and means moving the said shelf from its normal plane to the plane where the material can be so conveyed, as set out.

45. The combination in an automatic centrifugal having a rotating shell with solids exit passageways therein at one portion thereof, said passageways being normally sealed, a bottom for the said basket, a cleaning device for solids discharge, means for putting the said cleaning device into action after the solids are moisture relieved, means for opening the said passageways and whereby the solids are brought by the said cleaning device to the plane of the said passageways and are thus permitted to pass over the said bottom and out of the said ports or passageways by centrifugal force.

46. The combination in an automatic centrifugal of a basket, a material feeding pipe or conductor from a source of supply to the said basket, a gate or valve in the said conductor, means for automatically opening the said gate or valve, means for rotating the said basket, means for regulating a period for valve opening, a timing mechanism for predetermining a period for purging, means to regulate and vary this timing mechanism and means to clean the basket automatically after the period as predetermined by the said timing mechanism has expired.

47. The combination in an automatic, centrifugal of a basket, a feeding conductor to said basket wherethrough is conveyed material for purging, a valve in the said conductor, means to automatically open the said valve, means to rotate the said basket, a timing mechanism for predetermining a perior for basket rotation, comprising an indicator finger, means to set this finger to various positions and a connection between the finger mechanism and the basket operating mechanism, a spraying device, means for automatically operating the said spraying device for washing sugars after purging and means for automatically cleaning the basket of purged sugars after purging and washing, as set out.

48. In an automatic centrifugal the combination of a filtering basket, a bottom for the said basket, a bottom support, a liquid chamber into which liquid is discharged as filtered, a solids chamber into which solids are discharged intermittently as purged, a partition comprising telescopic rings 152 and 153 between the said two chambers, means for raising and lowering the said basket between each period for purging and cleaning, means for cleaning the said basket when the said bottom is lowered at which time the said rings prevent the solids from passing into the liquid chamber by arresting their movement theretoward in being so discharged.

49. In an automatic centrifugal having a moving cylindrical wall for its draining element, a bottom for the said wall, means for automatically feeding material into the said chamber before purging, solids egress ports in the said wall, means for bringing the said solids in the plane of the said solids egress ports after purging, means for automatically cleaning the said wall after purging consisting of a sweep, said sweep carrying angular deflecting shelves or blades, whereby the solids are deflected to the plane of the egress ports and permitted to pass out of the machine by the action of centrifugal force.

50. In an automatic centrifugal the combination of a basket, said basket having solids egress ports normally or while purging sealed against solids passage, a movable bottom for the said basket, means for placing the said bottom at a predetermined point in the cycle of the machine below the said egress ports, means for deflecting the solids on said bottom from the purging wall of the basket when the said bottom is so moved, consisting of a wall scraper, and coacting deflectors, whereby the solids will pass by the action of the scraper and deflector onto the said bottom and thereafter out of the said egress ports.

51. In an automatic centrifugal and in combination with the basket and feeding devices therefor an automatic cleaner comprising a series of wall scrapers and deflectors, a common supporting stem therefor, automatic means for moving the said deflectors and scrapers into the said basket after purging at a predetermined time and means for moving the said deflectors out of the said basket after cleaning, as set out.

52. In an automatic centrifugal the combination of a rotating basket, a bottom for the said basket, means for moving the said bottom from its normal horizontal plane to a second plane and position, solids egress passageways in the said basket wall normally below the bottom, means for moving the said bottom from its normal horizontal plane to a plane below the said egress ports, being in the said second position by this movement, means for cleaning the said basket wall of purged solids when the bottom is so moved comprising a series of cutters and deflectors, a common vertical supporting shaft therefor, automatic means by which said deflectors are brought into action as the bottom is placed in its second position, whereby the said deflectors engage the solids on the wall of the basket and force them therefrom on the said bottom.

53. The combination in an automatic centrifugal of a purging basket, a basket shaft, a prime shaft, independent means for operating the said two shafts, a timing mechanism for predetermining and controlling the operation of the basket shaft operated by the prime shaft and mechanical connection between the said timing mechanism and basket shaft whereby the former controls the purging speed of the latter.

54. The combination in an automatic centrifugal of a basket, means to rotate the said basket, a bottom for the said basket, means to reciprocate the said bottom in the said basket whereby at one point in the cycle of the machine the said bottom is moved down, a cleaning mechanism for the removal of purged residuum from the said basket and means for putting the said cleaning mechanism into the basket when the said bottom is moved down as set out.

55. The combination in an automatic centrifugal of a purging basket, means to rotate the said basket, a bottom for the said basket, a shaft on which the said bottom is carried, means for lowering and raising the said basket bottom comprising a bearing, a shaft and a mechanical connection between the bearing and the shaft and means for oscillating the shaft.

56. In an automatic centrifugal the combination of a basket having a filtering wall, means to rotate the said basket, a bottom for the said basket, a shaft, a bearing for supporting the said shaft and therethrough the said bottom, and means for vertically reciprocating the said bearing.

57. The combination in an automatic centrifugal machine of a basket, means to rotate the said basket at two different speeds, a time predetermining indicator for predetermining high speed rotation of the said basket, means to operate the indicator, means to lock the indicator to its operating means and means to reseat the indicator at a predetermined time.

58. The combination in an automatic centrifugal of a basket, means to rotate the said basket, means to feed the basket, means to vary the speed of the basket, a cleaner for the said basket, means to automatically put the cleaner in action at a predetermined slow speed and means to automatically put the cleaner out of action.

59. In an automatic centrifugal the combination of a basket, means for rotating the said basket, means for predetermining a purging period for said basket, an indicating device for predetermining and controlling said purging period, means for varying this period and an automatically operated cleaning device, said device for cleaning after the indicating device is out of action and the purging time as predetermined has expired.

60. In an automatic centrifugal the combination of a basket, means for giving the said basket two speeds the high speed being its purging speed and means for cleaning the basket at its slow speed.

61. The combination in an automatic centrifugal of a basket, means to give to the said basket two speeds, means to predetermine the period of the said speeds and means to clean the basket at the slow speed.

62. The combination in an automatic centrifugal of a basket, means to give to the said basket two speeds with the high as its purging speed and the low its solids cleaning speed, means for cleaning the basket at its slow speed and means for feeding the basket at the slow speed after the said cleaner has cleaned the basket and is out of action.

63. In an automatic centrifugal the combination of a basket, means for giving the said basket two speeds, means to indicate the time of high speed, means to vary this indication and whereby different materials can be purged for different periods of time by the same machine.

64. The combination in an automatic centrifugal of a basket, means for giving the said basket two speeds, the high being a purging speed, the low its solids cleaning speed, means to wash the sugars at high speed at a point in the cycle of the machine and means to move the purged and washed sugars to a point in the basket where it is brought under the influence of centrifugal force in being expelled therefrom.

65. The combination in an automatic centrifugal of a basket having a filtering wall, a solids egress passage in said basket out of the zone occupied by the filtering wall section, means for passing the solids from the filtering area to the said solids egress passage after filtration so the said solids come under the influence of centrifugal action in being expelled therefrom.

In testimony whereof I affix my signature in presence of two witnesses.

HOMER A. HERR.

Witnesses:
J. JULIUS HOVEY,
M. D. HERR.